United States Patent
Pennington et al.

(10) Patent No.: US 8,506,285 B2
(45) Date of Patent: Aug. 13, 2013

(54) METHOD AND APPARATUS FOR REFORMING A PORTION OF A PLASTIC CONTAINER USING INDUCTION HEATING

(75) Inventors: Garrett R. Pennington, Manheim, PA (US); Thomas Scott Smeltzer, York, PA (US); Patrick Matthew Oconnell, Hershey, PA (US); David Wayne Cargile, Lancaster, PA (US); Gregory Duane Taylor, York, PA (US)

(73) Assignee: Graham Packaging Company, L.P., York, PA (US)

( * ) Notice: Subject to any disclaimer, the term of this patent is extended or adjusted under 35 U.S.C. 154(b) by 575 days.

(21) Appl. No.: 12/740,368

(22) PCT Filed: Apr. 6, 2010

(86) PCT No.: PCT/US2010/030082
§ 371 (c)(1),
(2), (4) Date: Apr. 29, 2010

(87) PCT Pub. No.: WO2010/118014
PCT Pub. Date: Oct. 14, 2010

(65) Prior Publication Data
US 2011/0315592 A1   Dec. 29, 2011

Related U.S. Application Data

(60) Provisional application No. 61/167,344, filed on Apr. 7, 2009.

(51) Int. Cl.
*B65D 85/00* (2006.01)
*B29C 51/42* (2006.01)

(52) U.S. Cl.
USPC ............................. 425/540; 425/538

(58) Field of Classification Search
USPC ................. 425/528, 529, 538, 540; 264/535, 264/538, 403
See application file for complete search history.

(56) References Cited

U.S. PATENT DOCUMENTS 2,266,417 A   12/1939 Eisler
2,475,915 A   4/1944 Orr
(Continued)

FOREIGN PATENT DOCUMENTS

EP   0057504   8/1982
EP   0381322   12/1990
(Continued)

OTHER PUBLICATIONS

Handbook of Induction Heating, Rudnev et al, 2002, pp. 273-274 (3 pg. pdf, from google books).*

(Continued)

*Primary Examiner* — Joseph S Del Sole
*Assistant Examiner* — Kimberly A Stewart
(74) *Attorney, Agent, or Firm* — Stradley Ronon Stevens & Young, LLP

(57) ABSTRACT

An apparatus (10, 10') and a machine (100) for reforming a portion of a plastic package (50) using induction heating. The apparatus and machine comprise a frame (20) engaging the plastic package and a workpiece support (40) having an electrically conducting workpiece (44, 48, 102). An induction workhead (62) provides an alternating current power supply to an induction element (60, 104). The induction element is positioned proximate the workpiece of the workpiece support and heats the workpiece via induction. A mechanism (22) positions the plastic package proximate the heated workpiece so that the workpiece transfers heat to the portion of the plastic package thereby softening the portion. A forming die (30) supported on the frame engages the portion to reform the portion. Also provided is a process of using the apparatus and machine to reform a portion of a plastic package using induction heating.

9 Claims, 25 Drawing Sheets

(56) References Cited

U.S. PATENT DOCUMENTS

| | | | | |
|---|---|---|---|---|
| 2,454,910 | A | 4/1946 | Carr | |
| 3,173,174 | A | 3/1965 | Edwards | |
| 3,186,028 | A * | 6/1965 | Dobbins et al. | 425/526 |
| 3,195,450 | A | 7/1965 | Sciame | |
| 3,354,509 | A | 11/1967 | Ammondson | |
| 3,418,409 | A | 12/1968 | Hesse et al. | |
| 3,432,586 | A | 3/1969 | Stenger | |
| 3,456,290 | A | 7/1969 | Ruekberg | |
| 3,457,590 | A | 7/1969 | Dittmann | |
| 3,464,582 | A | 9/1969 | Greitzer et al. | |
| 3,540,371 | A | 11/1970 | Rome et al. | |
| 3,790,087 | A | 2/1974 | Banyas et al. | |
| 3,846,531 | A | 11/1974 | Reilly | |
| 3,862,698 | A | 1/1975 | Hafele | |
| 3,874,830 | A | 4/1975 | Carter et al. | |
| 3,947,204 | A | 3/1976 | Ayres et al. | |
| 3,969,455 | A | 7/1976 | Moller | |
| 3,973,897 | A * | 8/1976 | Berggren et al. | 425/526 |
| 4,034,036 | A | 7/1977 | Farrell | |
| 4,051,754 | A | 10/1977 | Harcuba et al. | |
| 4,061,702 | A | 12/1977 | Kessler | |
| 4,103,411 | A | 8/1978 | Gottsegen | |
| 4,151,024 | A | 4/1979 | Ohlsson | |
| 4,179,252 | A | 12/1979 | Seufert | |
| 4,297,306 | A | 10/1981 | Yoshino et al. | |
| 4,323,411 | A | 4/1982 | Uhlig | |
| 4,324,601 | A | 4/1982 | Dembicki et al. | |
| 4,379,099 | A | 4/1983 | Ota et al. | |
| 4,450,765 | A | 5/1984 | Van Steenkiste | |
| 4,497,622 | A | 2/1985 | Grebowiec | |
| 4,497,758 | A | 2/1985 | Clark | |
| 4,522,770 | A | 6/1985 | Andersen | |
| 4,650,628 | A | 3/1987 | Evely | |
| 4,696,636 | A | 9/1987 | Evely | |
| 4,701,295 | A | 10/1987 | Kato et al. | |
| 4,717,522 | A | 1/1988 | Evely | |
| 4,717,523 | A | 1/1988 | Evely | |
| 4,856,667 | A | 8/1989 | Thompson | |
| 4,928,835 | A | 5/1990 | Collette et al. | |
| 4,954,310 | A | 9/1990 | Andersen | |
| 4,968,242 | A | 11/1990 | Andersen | |
| 5,032,700 | A * | 7/1991 | Sugiyama et al. | 219/601 |
| 5,045,255 | A | 9/1991 | Kurz | |
| 5,067,888 | A | 11/1991 | Torsten | |
| 5,115,938 | A | 5/1992 | Thompson | |
| 5,200,587 | A | 4/1993 | Fang | |
| 5,215,694 | A | 6/1993 | Bartimes et al. | |
| 5,238,642 | A | 8/1993 | Benquet et al. | |
| 5,259,858 | A | 11/1993 | Inao et al. | |
| 5,429,777 | A | 7/1995 | Nilsson | |
| 5,431,291 | A | 7/1995 | LaBombarbe, Jr. | |
| 5,441,675 | A | 8/1995 | Souders | |
| 5,467,628 | A | 11/1995 | Bowlin et al. | |
| 5,582,957 | A | 12/1996 | Sirianni et al. | |
| 5,718,853 | A * | 2/1998 | Ingram | 264/40.1 |
| 5,807,592 | A | 9/1998 | Alieri | |
| 5,827,467 | A | 10/1998 | Ruppert et al. | |
| 5,879,723 | A | 3/1999 | Stachowiak | |
| 5,980,811 | A | 11/1999 | Towns | |
| 5,989,665 | A | 11/1999 | Connell et al. | |
| 6,003,699 | A | 12/1999 | Laszlo et al. | |
| 6,062,408 | A | 5/2000 | Beck et al. | |
| 6,113,840 | A | 9/2000 | Emmer et al. | |
| 6,126,886 | A | 10/2000 | Beck et al. | |
| 6,187,399 | B1 | 2/2001 | Sandor et al. | |
| 6,237,791 | B1 | 5/2001 | Beck et al. | |
| 6,241,111 | B1 | 6/2001 | Sandor et al. | |
| 6,315,967 | B1 | 11/2001 | Potter et al. | |
| 6,361,640 | B1 | 3/2002 | Kamen et al. | |
| 6,361,842 | B1 | 3/2002 | Stachowiak | |
| 6,434,812 | B1 | 8/2002 | Andersson et al. | |
| 6,530,301 | B1 | 3/2003 | Seitz et al. | |
| 6,536,616 | B2 | 3/2003 | Sandor et al. | |
| 6,555,033 | B2 | 4/2003 | Cargile et al. | |
| 6,629,834 | B2 | 10/2003 | Cargile et al. | |
| 6,675,680 | B1 | 1/2004 | Seitz et al. | |
| 6,789,398 | B1 | 9/2004 | Daoud et al. | |
| 6,855,289 | B2 | 2/2005 | Krishnakumar et al. | |
| 7,147,451 | B2 | 12/2006 | Johnson | |
| 7,435,073 | B2 | 10/2008 | Chisholm et al. | |
| 7,438,704 | B1 * | 10/2008 | Kawashima et al. | 604/295 |
| 7,637,733 | B2 | 12/2009 | O'Connell et al. | |
| 2003/0042649 | A1 | 3/2003 | Bernard | |
| 2005/0068182 | A1 | 3/2005 | Dunlap et al. | |
| 2005/0269744 | A1 | 12/2005 | Lonsway | |
| 2005/0280542 | A1 | 12/2005 | Shieh | |
| 2006/0119004 | A1 | 6/2006 | Chmura et al. | |
| 2006/0127618 | A1 | 6/2006 | O'Connell et al. | |
| 2007/0126152 | A1 | 6/2007 | Chisholm | |
| 2007/0139202 | A1 | 6/2007 | Austin | |
| 2008/0054524 | A1 | 3/2008 | Chisholm et al. | |
| 2008/0054526 | A1 | 3/2008 | Barker et al. | |
| 2009/0049975 | A1 * | 2/2009 | Tada et al. | 83/875 |
| 2010/0000959 | A1 | 1/2010 | O'Connell et al. | |
| 2010/0252952 | A1 | 10/2010 | Pennington | |
| 2011/0315592 | A1 | 12/2011 | Pennington et al. | |

FOREIGN PATENT DOCUMENTS

| | | |
|---|---|---|
| EP | 1 230 905 | 8/2002 |
| GB | 1010603 | 11/1965 |
| GB | 1346681 | 2/1974 |
| GB | 2015914 | 9/1979 |
| GB | 2092567 | 8/1982 |
| GB | 2187129 | 9/1987 |
| JP | 61116513 | 6/1986 |
| JP | 2011138388 | 5/2001 |
| MX | 2007001652 | 7/2007 |
| NL | 8203001 | 7/1983 |
| NL | 8901766 | 2/1991 |
| WO | 2006020761 | 2/2006 |
| WO | WO 2006/060350 | 6/2006 |
| WO | 2007095086 | 8/2007 |
| WO | 2008027729 | 3/2008 |
| WO | 2010118014 | 10/2010 |

OTHER PUBLICATIONS

EPO's International Search Report mailed Dec. 6, 2010 for International Application No. PCT/US2010/030082.
Blow Molding Handbook, Edited by Donald V. Rosato, PhD and Dominick V. Rosato PE, 1989, pp. 7, 8, 15 and 34.
The America Heritage Dictionary of the English Language, 3rd Edition, 1996, p. 1518, see "reform" and "re-form".
Fundamentals of Manufacturing, 2nd Edition, Society of Manufacturing Engineers, 2002, p. 230.
PCT/US2005/028538—International Search Report and Written Opinion mailed Dec. 15, 2005.
PCT/US2005/043022-International Preliminary Report on Patentability issued Jun. 5, 2007.
PCT/US2005/043022-International Search Report and Written Opinion mailed May 4, 2006.
PCT/US2005/028538—International Preliminary Report on Patentability issued Jul. 5, 2006.
PCT/US2007/003467 International Preliminary Report on Patentability issued Aug. 12, 2008.
PCT/US2007/003467 International Search Report and Written Opinion issued Jul. 31, 2007.
PCT/US2007/076060—International Preliminary Report on Patentability issued Mar. 3, 2009.
PCT/US2007/076060—International Search Report and Written Opinion mailed Oct. 3, 2008.
PCT/US2010/030082—International Preliminary Report on Patentability issued Oct. 11, 2011.
Plastics Processing Technology, Edward A. Muccio, 1994, pp. 124-125.
Understanding Blow Molding 2nd Edition, Norman C. Lee, 2007, pp. 13 and 34.
Patent Abstracts of Japan vol. 2000, No. 22, Mar. 9, 2001 & JP 2001138388A (Kuroda Plastic Kogyo KK) May 22, 2001.
PCT/US2010/030082—International Search Report and Written Opinion mailed Dec. 6, 2010.

* cited by examiner

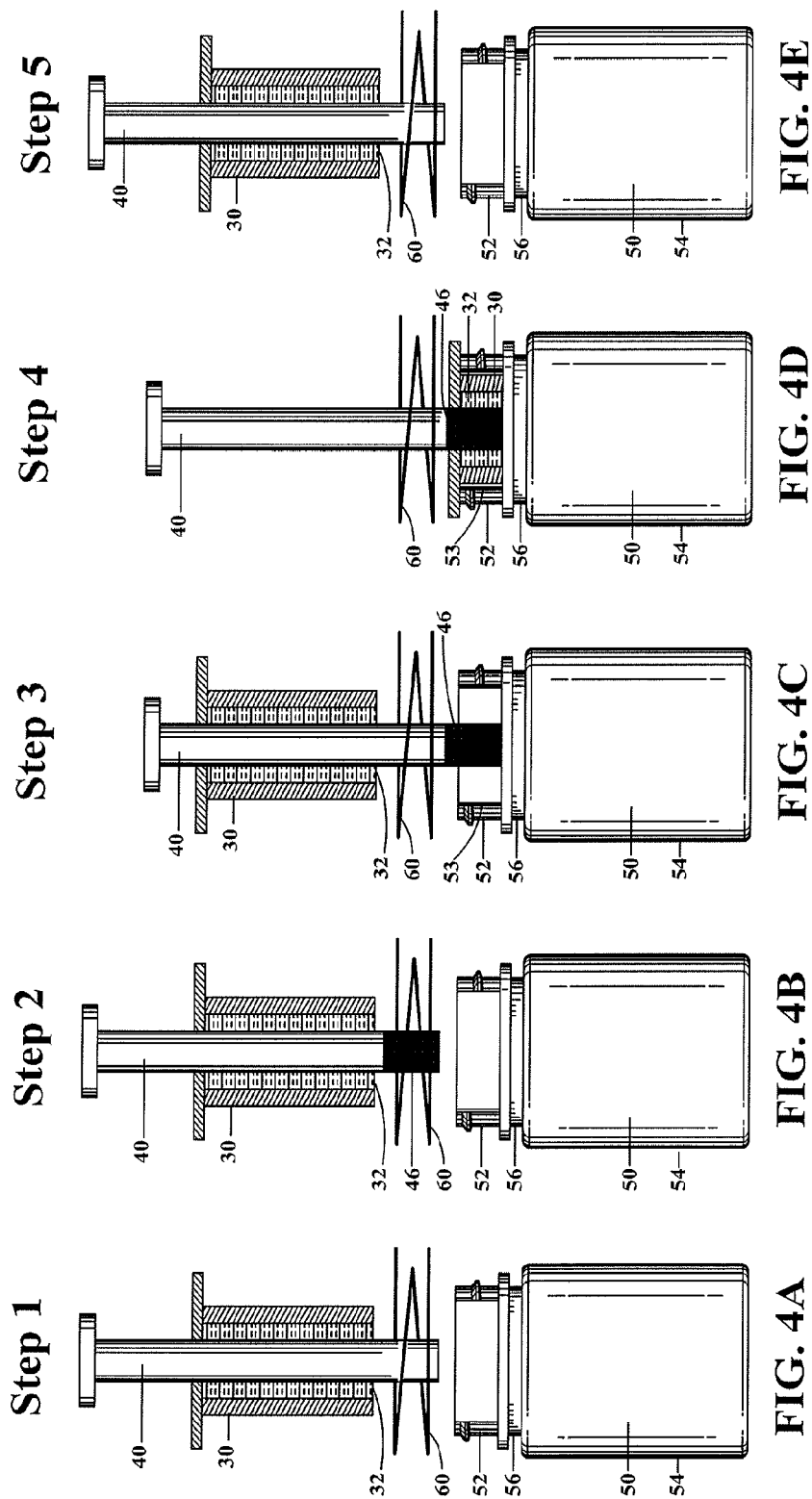

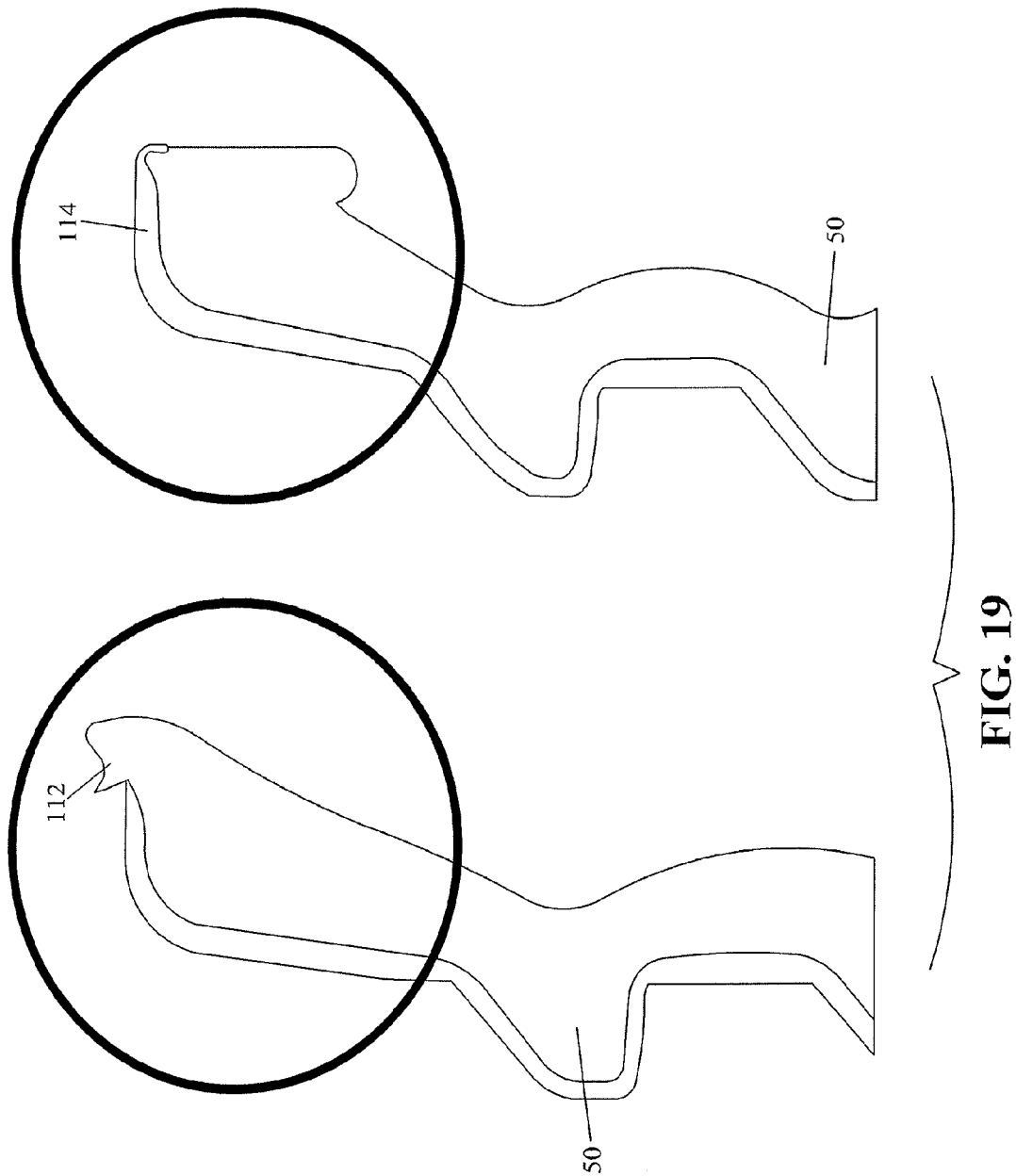

FIG. 22A
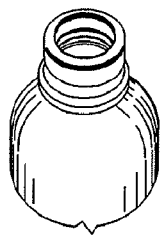
Spin Trim to Smooth TSS
FIG. 22B
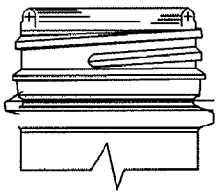
Spin Trim to Bullet Finish
FIG. 22C
Blown to Calibrated Neck for Plug Seals
FIG. 22D
Custom Neck Pour Features
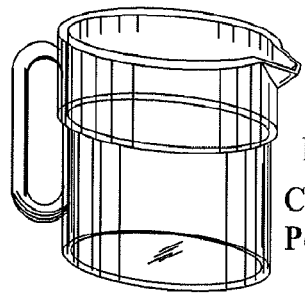
FIG. 22E
Custom Features for Spout / Bottle Assembly
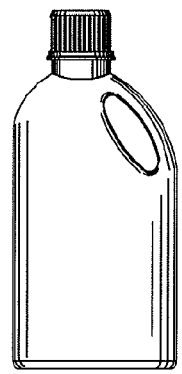
Compression Form External Features
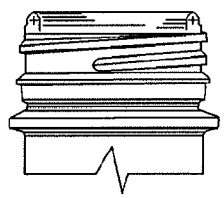
FIG. 22F
FIG. 22G
Blown then Inverted Spouts
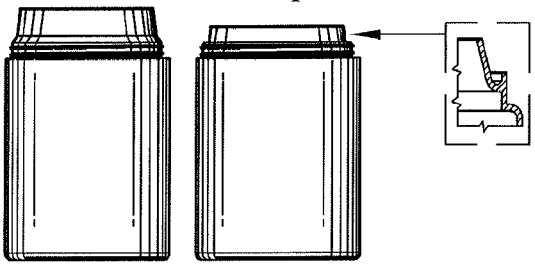
FIG. 22H
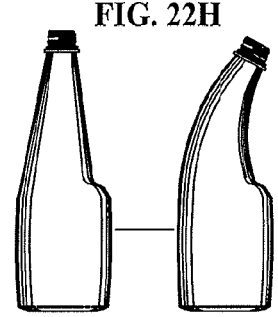
Straight to Angled Neck
FIG. 22I
Post Form Handle on PET Package
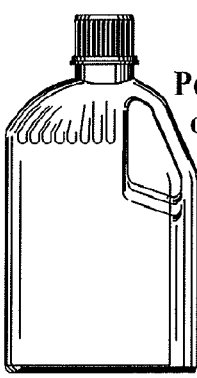

FIG. 23

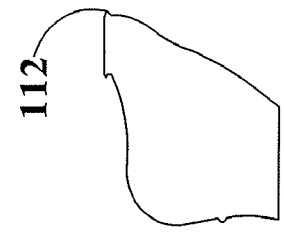
FIG. 24B
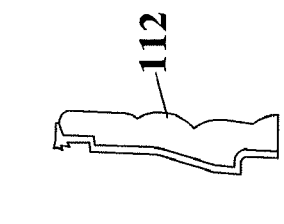
FIG. 25B
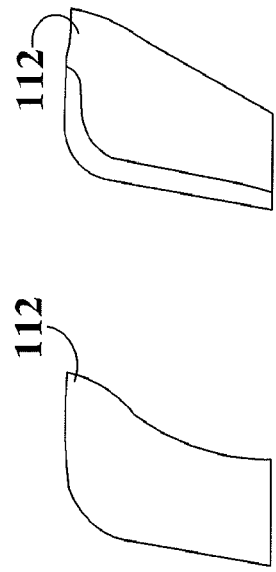
FIG. 26B
FIG. 27B
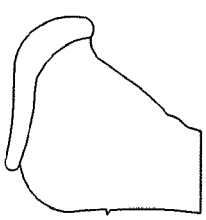
FIG. 24A
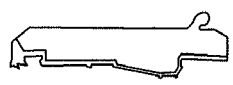
FIG. 25A
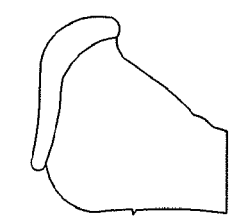
FIG. 26A
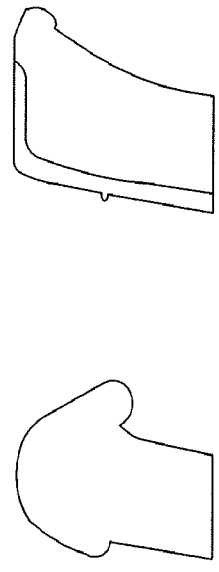
FIG. 27A

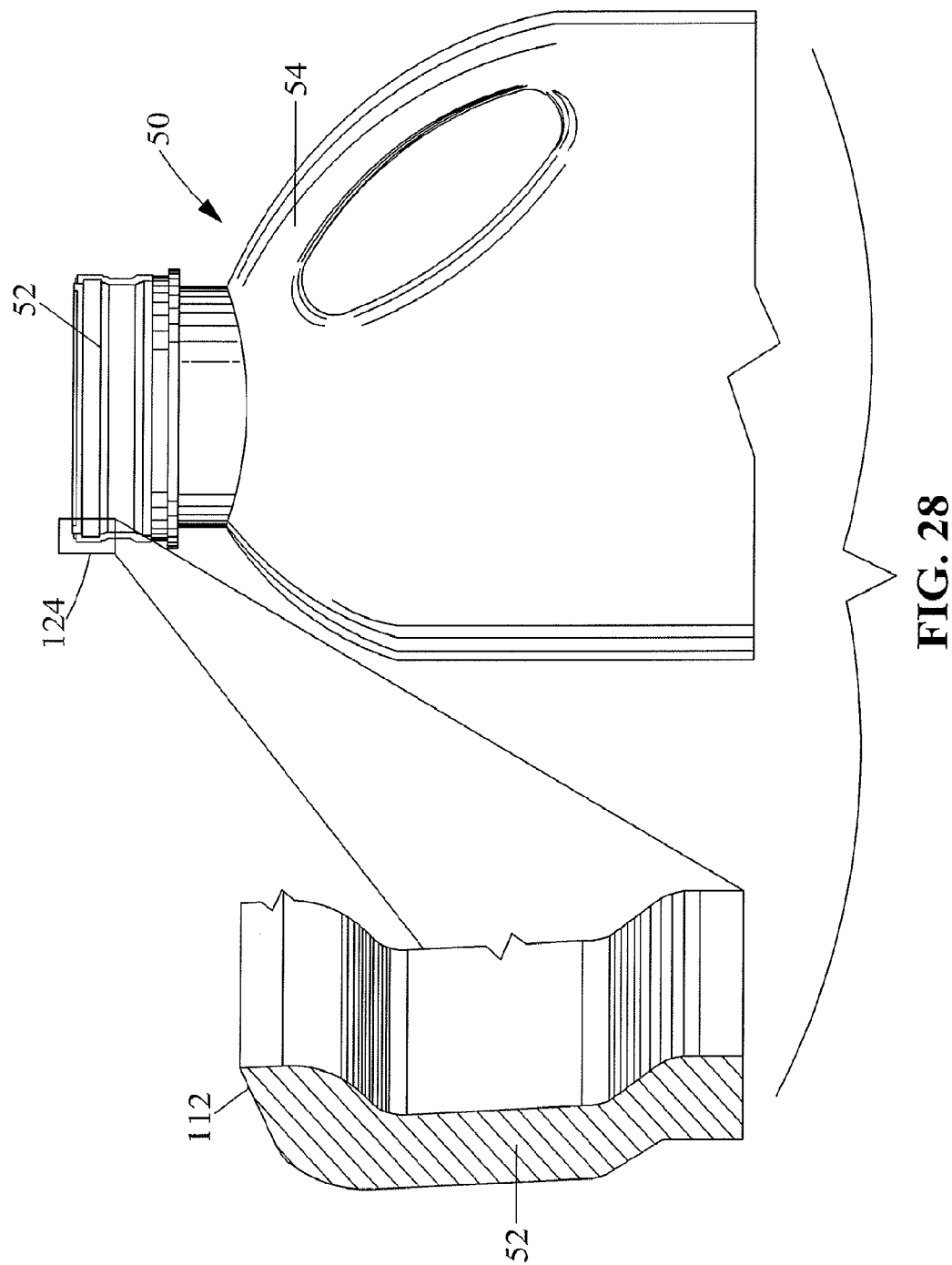

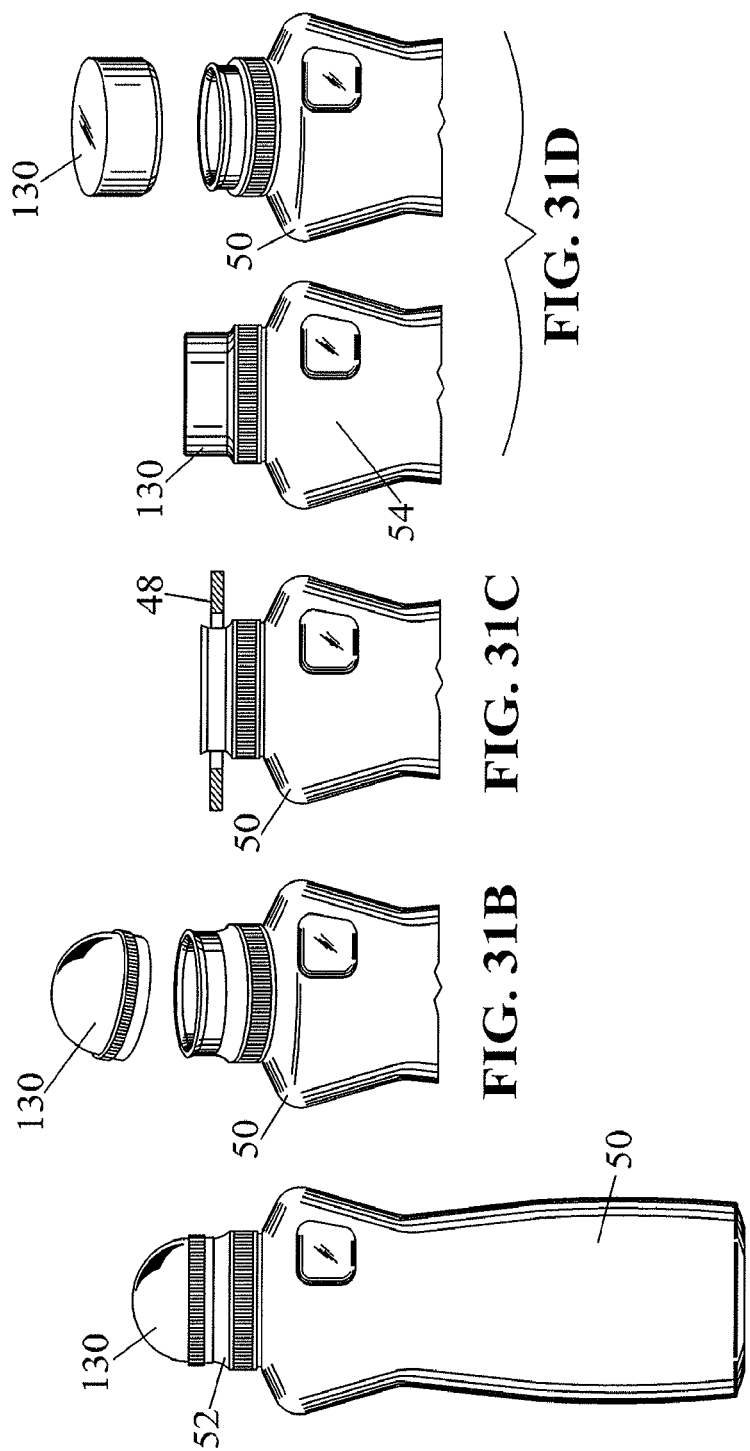

METHOD AND APPARATUS FOR REFORMING A PORTION OF A PLASTIC CONTAINER USING INDUCTION HEATING

RELATED APPLICATION

This application claims the benefit of priority to U.S. Provisional Patent Application Ser. No. 61/167,344, filed on Apr. 7, 2009, the contents of which are incorporated in this application by reference.

TECHNICAL FIELD

The present invention relates generally to plastic containers and, more specifically, to a method (or process) and an apparatus for reforming a portion of a plastic container and, most specifically, a blow-molded plastic container.

BACKGROUND OF THE INVENTION

Capping processes for plastic containers typically require the upper portion of the container, such as the neck finish, to meet exacting dimensional tolerances. To achieve the necessary tolerances, the upper portions of the containers are usually produced using injection molding processes, for example, by injection blow molding the containers. Injection blow molding processes are at a significant output-to-cavity disadvantage, however, when compared to other types of blow molding, such as extrusion blow molding. In addition, injection blow molding often requires expensive injection manifolds and involves sensitive injection processes.

According to another method of making containers, a preform with a pre-configured upper portion (e.g., neck finish) is made by injection molding. Subsequently, a container is blow molded from the lower portion of the preform. The upper portion can become distorted during blow molding, however, due to the heat applied to the preform. This can cause the pre-configured upper portion to fall out of tolerance.

The process of extrusion blow molding plastic containers typically involves the steps of extruding a tube of monolayer or multilayer plastic material, capturing the tube between opposed mold sections, blowing the tube to the contours of the mold cavity, opening the mold, removing the container, and trimming the end of the container neck finish. This trimming operation can involve removal of a flash or moil from the neck finish. The trimmed material may be scrapped or, alternatively, recycled as process regrind.

In another exemplary extrusion blow molding operation, the trimming operation can involve separation of two containers that are molded end-to-end. In either case, the trimming operation can leave an uneven end surface for later sealing engagement with a container closure. Furthermore, the end surface of the container neck finish may have mold parting line seams that can deleteriously affect sealing engagement with a container closure. These uneven or inconsistent end surface features can also affect induction sealing. Induction sealing can typically involve induction welding a metallic liner disk to a container end surface after filling the container to obtain a satisfactory container seal.

In order to address these disadvantages, it has been proposed to burnish the end surface of the container neck finish by contacting the neck finish end surface with a heated burnishing tool. Upon contacting the container neck finish end surface, the tool simultaneously heats the end portion of the neck finish to a particular softening temperature of the plastic material and modifies the end surface to eliminate mold parting line seams, uneven trim portions, and other post-molding imperfections. This process also has certain disadvantages.

For example, the heated plastic of the container neck finish may tend to stick to the heated burnishing tool. It is also difficult to control the temperature of the burnishing tool so as to obtain a desired temperature at the burnishing surface of the tool. Moreover, effective burnishing often requires that one of the container or the burnishing tool be rotated relative to the other to achieve a desired effect. Such rotation introduces additional process variables and, consequently, affects production speed. Thus, the tendency of the heated plastic to stick to the burnishing tool, in combination with the oft-required rotational step and difficulty of controlling the burnishing surface temperature of the tool, makes it difficult to determine and control the optimum tool-to-surface contact time (i.e., dwell time). The dwell time, during which the burnishing tool is in contact with the end portion of the neck finish, as well as additional process variables, should be minimized to achieve desired production speeds. Regardless, in many applications, burnishing is unable to manipulate sufficient plastic to achieve practical production cycle times.

Another proposed solution to the disadvantages outlined above is to reform the neck finish after the container is initially formed. In this solution, the container is heated to soften the portion of the container that requires reforming and then a tool is brought into contact with the softened portion. Typically, heat is applied using infrared (IR) heat lamp tunnels or heater bands. IR radiation is electromagnetic radiation whose wavelength is longer than that of visible light (400-700 nm), but shorter than that of terahertz radiation (100 μm-1 mm) and microwaves (about 30,000 μm). Infrared radiation spans roughly three orders of magnitude (750 nm and 100 μm).

This IR-reforming process also has certain disadvantages. IR lamps generally only heat the top sealing surface (or TSS) of a container. This means the heat must migrate through the neck finish in order to shape the inner diameter of the neck. During this heating process, the neck finish becomes deformed and can yield containers that fall outside design specifications. It is possible to manufacture specifically shaped IR lamps (round, square, etc.) for localized heating. The disadvantage of doing this is cost; custom lamps are very expensive. Lamps are also delicate, which is a major concern in a production environment. A broken lamp will result in line down time due to replacement of the lamp, will require clean up of broken glass, and could prompt product recalls should glass contaminate the product. IR lamp heating also requires relatively long cycle times and imposes high machine costs.

In summary, in order to achieve desirable tolerance levels using conventional extrusion blow molding technology, the containers typically have to undergo some type of cutting, stamping, or trimming operation. These operations have not proven to be reliable for producing the required dimensional tolerances. Nor have these operations, and others such as reforming, met the need for reduced cycle times demanded of modern, cost-effective, manufacturing processes. Another disadvantage of cutting, stamping, or trimming is the production of chips. Any packages that have been subjected to an operation that generates chips must go through a series of cleaning steps. This results in extra equipment on the line. It also results in customer complaints and product recalls in the event that all the plastic chips have not been removed from the package.

Therefore, there remains a need in the art for improved methods, apparatus, and containers that overcome the shortcomings of conventional solutions. To overcome the shortcomings of the current solutions applied to form and reform plastic containers, a new apparatus, machine, and process are provided. An object of the present invention is to decrease the cycle time (i.e., increase the speed of production output) required to manufacture plastic packages such as containers. A related object is to eliminate or at least minimize cutting, stamping, trimming, or burnishing operations. Another object is to increase the amount of plastic that can be manipulated in a practical cycle time, thereby expanding the feasible applications of the technology.

Yet another object is to decrease the cost and complexity of the machinery used to manufacture plastic packages. An additional object is to replace the IR lamps and heater bands found in the conventional solutions. It is still another object of the present invention to heat a precise area of a package very quickly so that the area can be reformed within efficient cycle times (i.e., to channel or focus the heat energy). A related object is to permit adjustment of the precise area of heating to meet the specific requirements of a particular application. Still another object is to provide an apparatus, a machine, and a method having sufficient flexibility to accommodate reforming a wide variety of containers and other plastic packages using induction heating.

BRIEF SUMMARY OF THE INVENTION

To achieve these and other objects, and to meet these and other needs, and in view of its purposes, the present invention provides an apparatus and a machine for reforming a portion of a plastic package using induction heating. The apparatus and machine comprise a frame engaging the plastic package and a workpiece support having an electrically conducting workpiece. An induction workhead provides an alternating current power supply to an induction element (e.g., a coil or rod). The induction element is positioned proximate the workpiece of the workpiece support and heats the workpiece via induction. A mechanism positions the plastic package proximate the heated workpiece so that the workpiece transfers heat to the portion of the plastic package thereby softening the portion. A forming die supported on the frame engages the portion to reform the portion.

The present invention also provides a method of using the apparatus and machine to reform a portion of a plastic package using induction heating. The method includes the following steps. First, a plastic package is provided having a discontinuity in the portion to be reformed. An induction workhead is activated to deliver alternating current to an induction element positioned proximate a workpiece, thereby heating the workpiece via induction. The plastic package is positioned proximate the heated workpiece so that the workpiece transfers heat to the portion of the plastic package thereby softening the portion. Finally, a forming die engages the softened portion to correct the discontinuity.

The present invention also encompasses the plastic package (typically, a container) reformed using the method. The portion of the plastic package to be reformed is often the neck finish of the plastic package. The neck finish can be any one of a variety of possible neck finishes, including a bullet, calibrated, a PET (the acronym PET designates the plastic polyethylene terephthalate, often used to manufacture containers such as bottles), a flat TSS, a household-chemical-automotive (HCA) assembly, or an inverted spout.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 4A illustrates the first step of a first exemplary embodiment of the process for reforming a portion of a plastic container according to the present invention;

FIG. 4B illustrates the second step of the first exemplary embodiment of the process for reforming a portion of a plastic container according to the present invention;

FIG. 4C illustrates the third step of the first exemplary embodiment of the process for reforming a portion of a plastic container according to the present invention;

FIG. 4D illustrates the fourth step of the first exemplary embodiment of the process for reforming a portion of a plastic container according to the present invention;

FIG. 4E illustrates the fifth step of the first exemplary embodiment of the process for reforming a portion of a plastic container according to the present invention;

FIG. 19 shows, in magnified views, the container both before (left) and after (right) the container is reformed according to the present invention;

FIGS. 22A-22I show some of the expanded feasible applications of reforming technology made possible by the apparatus, machine, and method of the present invention;

FIG. 23 is a chart illustrating the application of two of the embodiments of the reform machine to six different container neck finishes;

FIG. 24B is a magnified view of a bullet container neck finish before, and FIG. 24A is a magnified view of the same bullet container neck finish after, the container is reformed according to the present invention;

FIG. 25B is a magnified view of a flat TSS container neck finish before, and FIG. 25A is a magnified view of the same flat TSS container neck finish after, the container is reformed according to the present invention;

FIG. 26B is a magnified view of a calibrated container neck finish before, and FIG. 26A is a magnified view of the same calibrated container neck finish after, the container is reformed according to the present invention;

FIG. 27B is a magnified view of a PET container neck finish before, and FIG. 27A is a magnified view of the same PET container neck finish after, the container is reformed according to the present invention;

FIG. 28 illustrates the upper portion of the container having a spin trim style finish;

FIG. 31A illustrates the first step of a third alternative of the reform technology according to the present invention used to create a container having an inverted spout;

FIG. 31B illustrates the second step of the third alternative of the reform technology according to the present invention;

FIG. 31C illustrates the third step of the third alternative of the reform technology according to the present invention; and FIG. 31D illustrates the last step of the third alternative of the reform technology according to the present invention.

DETAILED DESCRIPTION OF THE INVENTION

In a sentence, the present invention heats and re-shapes a portion of a plastic package using induction heating. To expand slightly, the present invention can be applied to reform the neck finish (the TSS, the internal surface, or the outer surface), handle, or other specific areas of a package by exposing the surfaces that require reforming to a metal workpiece raised to an elevated temperature (approximately 1,400-2,000° F.). The workpiece is heated using a high-frequency magnetic field (induction heating).

Various embodiments of the apparatus and process of the present invention are described in detail below. Because the apparatus and process reflect an application of induction heating, a discussion of the principles of induction heating follows. An exemplary process is described, highlighting the advantageous reduction in cycle time achieved by the present invention. Several embodiments of a continuous reform machine are described. Finally, the apparatus and process of the present invention expand the feasible applications of reforming technology. Several examples of such applications are summarized.

A. The Apparatus

Figure 1:
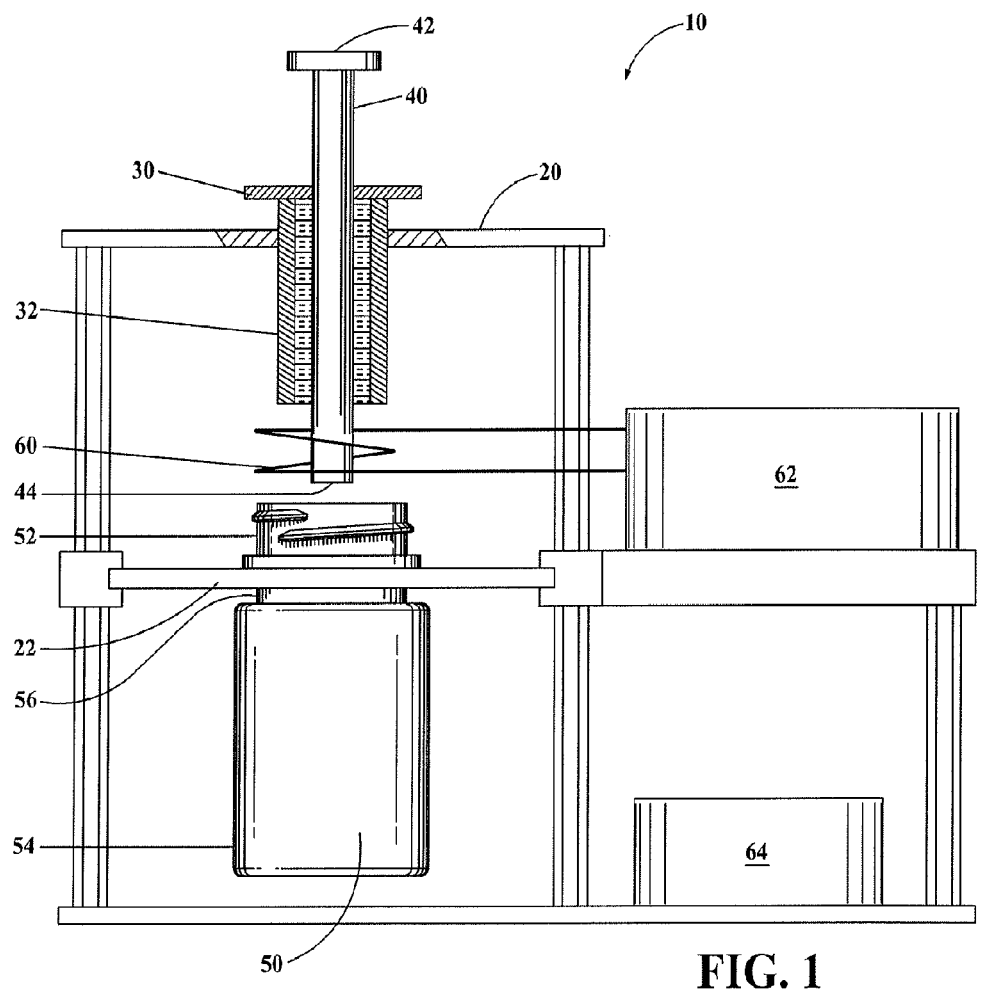
FIG. 1 is a schematic representation of a test apparatus depicting the main components of an exemplary embodiment according to the present invention.

Referring now to the drawing, in which like reference numbers refer to like elements throughout the various figures that comprise the drawing, FIG. 1 is a simple illustration of a test apparatus 10 depicting the main components of the present invention. A plastic container 50 includes an upper portion 52 and a body 54. In the exemplary embodiment shown, the plastic container 50 is in the shape of a container, for example, a beverage container, and the upper portion 52 and the body 54 are separated by a neck 56. The upper portion 52 can be adapted and configured to receive a closure, such as a metal lid, a layer of film (e.g., thermo-sealed or glued film), a snap-on lid, or a double-seam metal lid, although other configurations are possible.

One of ordinary skill in the art will know and appreciate that the plastic container 50, the upper portion 52, or both can take other forms. For example, the plastic container 50 may alternatively be a bowl such as a soup bowl, and the upper portion 52 may alternatively include a threaded neck finish or feature other geometries for sealing applications. The present invention is also not limited to sealing applications; rather, it includes features for alignment or assembly. One advantage of the present invention is that custom features can be produced for the alignment or assembly of other components that aid in the function of the total package (injected spouts, pumps, dosage metering devices, and the like). This flexibility opens up new applications because the invention can provide the tight tolerances and features that are required to interact with these devices. Some examples of features are, among others, internal threads, snap beads, anti-rotation features, and grooves for alignment. For purposes of illustration, however, the upper portion 52 is highlighted.

The upper portion 52 is typically formed during the blow molding of the plastic container 50, for example, during extrusion blow molding. The upper portion 52 may additionally or alternatively be formed, or modified, during a trimming or other operation that takes place, for example, after the plastic container 50 is blow molded. Alternatively, the upper portion 52 may be formed in connection with an injection or compression molding process, for example, on plastic containers 50 made using a reheat blow molding process or an injection/extrusion/blow molding process. Alternatively, the upper portion 52 may be formed in connection with an injection molded preform, in which the upper portion 52 is preconfigured during injection molding of the preform.

The present invention provides a method and an apparatus 10 that reforms a portion of the plastic container 50, for example, the upper portion 52. The upper portion 52 might be reformed, for example, to provide the shape and dimensional tolerances required for the capping or sealing process. (Distinguish the step of reforming from the steps of cutting, stamping, or trimming the container 50, which typically produce chips of material to be discarded, or from the step of burnishing, which does not manipulate the amount of plastic material quickly enough for efficient production processes.) The method includes softening the portion of the plastic container 50 to be reformed by heating it using induction to generate the original heat source.

The apparatus 10 includes a frame 20 having a neck clamp 22. The neck clamp 22 engages the plastic container 50 and may either hold the plastic container 50 in a fixed position or manipulate (e.g., raise or lower) the plastic container 50. The frame 20 supports a forming die 30, which may be water cooled. The forming die 30 may be stationary or may travel (up and down) along a workpiece support 40. The workpiece support 40 has a head 42 and a foot 44. As a matter of design choice, the workpiece support 40 may be stationary (and the plastic container 50 moved relative to the workpiece support 40), or the workpiece support 40 may move toward and away from the plastic container 50. A ceramic sleeve 32 is provided as an insulator between the forming die 30 and the workpiece support 40.

An induction coil 60 is positioned adjacent to the foot 44 of the workpiece support 40. The induction coil 60 is connected to an induction workhead 62. Among other components, none shown because all are within the knowledge of the artisan, the induction workhead 62 has an alternating current (AC) power supply. The induction workhead 62 may be supported on the frame 20 of the apparatus 10. A programmable logic controller (PLC) 64 provides the electronics for operating the apparatus 10. For example, the PLC 64 controls the timing sequences during operation of the apparatus 10: the plastic container 50 may be subjected to heat transfer for 5 seconds, then the forming die 30 may engage the plastic container 50 for 3 seconds. These parameters may vary as a function of the type of material and amount of material that requires manipulation.

Figure 2:
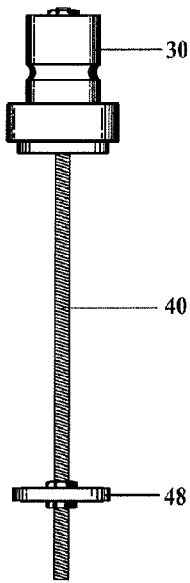
FIG. 2 illustrates an embodiment of the present invention in which the workpiece is a disk.

The induction coil 60 may heat the foot 44 of the workpiece support 40 itself, as shown in FIG. 1 (see also FIGS. 4A-E). In this embodiment, the workpiece (i.e., the material to be heated by the induction coil 60) is a rod-like portion of the workpiece support 40. The rod 46 is preferably made of a metal. Alternatively, the workpiece may be a disk 48 as shown in FIG. 2. The disk 48 is also preferably made of a metal and, advantageously, can be shaped to place the precise amount of heat exactly where such heat will most efficiently and expeditiously permit reformation of the plastic container 50.

In the embodiments illustrated, the induction coil 60 surrounds the workpiece 46, 48. It would be possible, however, to place a custom-shaped induction coil 60 on one side of the workpiece 46, 48 rather than completely around the workpiece 46, 48. Such placement could rely on the workpiece 46, 48 becoming a uniform temperature due to conduction of heat through the workpiece 46, 48. When the workpiece 46, 48 is large or an odd shape, the workpiece 46, 48 might be rotated to ensure that it attains a uniform temperature. Placement of the induction coil 60 aside rather than around the workpiece 46, 48 would reduce the cost of the production machine because the induction coil 60 could be placed on the ground (stationary) rather than on the rotating part of the machine (rotary turret). Placement of electrical equipment on a rotary turret requires rotary couplers to transfer power and electrical signals into the turret. These couplers increase the complexity and cost of the production machine.

The workpiece 46, 48 transfers heat to the plastic container 50, once brought into close proximity to the plastic container 50, via radiant and convection heating. As the plastic container 50 absorbs heat, it softens. After the plastic reaches an optimized temperature, the forming die 30 contacts the plastic. The forming die 30 creates the final shape of the heated plastic.

The forming die 30 may incorporate cooling via a chiller (see FIG. 16) and may also incorporate an alignment system (not shown). The alignment system orients the forming die 30 along the workpiece support 40. To give the forming die 30 the requisite finish quality, various techniques such as polishing and sandblasting may be used. The forming die 30 may also incorporate start timers that signal the PLC 64 based on the location of the forming die 30.

The materials used to form the workpiece (whether the workpiece is a rod 46, a disk 48, or another configuration) must be selected carefully. Various suitable materials are discussed below. The geometry of the workpiece 46, 48 (e.g., outside diameter, width, length, thickness) is also important and must be selected carefully for reasons discussed below. Like the forming die 30, the workpiece 46, 48 may also incorporate start timers that signal the PLC 64 based on the location of the workpiece 46, 48.

Figure 3:
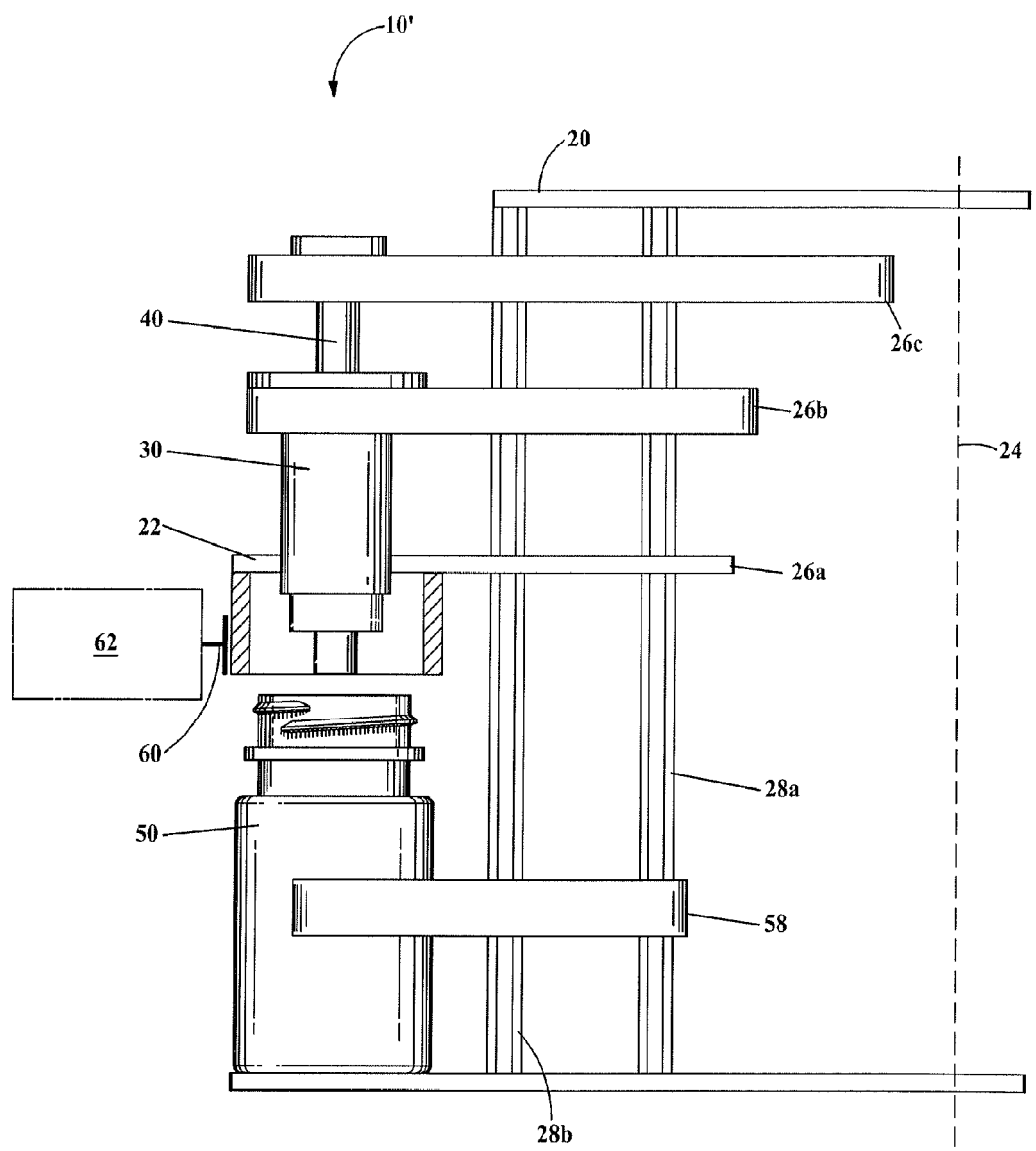
FIG. 3 is a schematic representation of a production apparatus depicting the main components of an exemplary embodiment according to the present invention.

FIG. 3 shows one embodiment of a production apparatus 10' of the present invention. The entire frame 20 of the apparatus 10' may be rotated about a centerline 24. Such rotation facilitates efficient infeed of plastic containers 50 to, processing of plastic containers 50 on, and outfeed of plastic containers 50 from the apparatus 10'. A container alignment holder 58 aligns and holds the plastic container 50 relative to the frame 20.

A first cam 26*a*, a second cam 26*b*, and a third cam 26*c* are provided to move various components of the apparatus 10'. For example, the first cam 26*a* may move the neck clamp 22 into and out of engagement with the plastic container 50. The second cam 26*b* may move the forming die 30 into and out of engagement with the plastic container 50. Finally, the third cam 26*c* may move the workpiece support 40 into and out of proximity with the plastic container 50. A first slide 28*a* and a second slide 28*b* are provided. The cams 26*a*, 26*b*, and 26*c* travel along the slides 28*a* and 28*b*.

B. The Process

Two exemplary embodiments of the process of reforming the plastic container 50 using the apparatus 10, 10' of the present invention are illustrated, respectively, in the five steps of FIGS. 4A-4E and in the four steps of FIGS. 5A-5D. In the five-step embodiment, the plastic container 50 is stationary. In the four-step embodiment, the workpiece support 40 and the induction coil 60 are stationary and the plastic container 50 is moved into and out of engagement with those components of the apparatus 10, 10'.

Step 1 of the five-step embodiment is shown in FIG. 4A. In this step, the plastic container 50 is loaded into the frame 20 of the apparatus 10, 10' using a conventional mechanism (e.g., a conveyor belt and funnel or pickup arm). Step 2 is illustrated in FIG. 4B. In Step 2, the induction coil 60 is energized to create a magnetic field which heats the workpiece (such as the rod 46) via induction heating.

Step 3 is illustrated in FIG. 4C. In Step 3, the workpiece support 40 is lowered into position within the upper portion 52 of the plastic container 50 so that heat emitted by the rod 46 softens the upper portion 52. The reference number 53 depicts the softened area of the upper portion 52. As shown in FIG. 4C, the rod 46 heats the entire length of the upper portion 52. The induction coil 60 and rod 46 (or disk 48) can be designed, however, to heat a precise area of the plastic container 50 such as, for example, only the top quarter of the upper portion 52.

Step 4 is illustrated in FIG. 4D. In Step 4, the forming die 30 is lowered into position within the upper portion 52 of the plastic container 50 and the forming die 30 is activated. The forming die 30 forms the upper portion 52 of the plastic container 50, giving the plastic container 50 the desired neck finish. The workpiece support 40 does not move in Step 4. In the embodiment shown, the forming die 30 is chilled so that the forming die 30 cools the upper portion 52 simultaneously as it forms the upper portion 52. It would be possible, of course, to separate the forming and cooling steps into distinct process operations.

Step 5 is illustrated in FIG. 4E. In Step 5, the forming die 30 and the workpiece support 40 are removed from the upper portion 52 of the plastic container 50 by raising the forming die 30 and the workpiece support 40. The reformed plastic container 50 can then be removed from the apparatus 10, 10'. The apparatus 10, 10' is then ready to accept, and act upon, another plastic container 50.

Figure 5B:
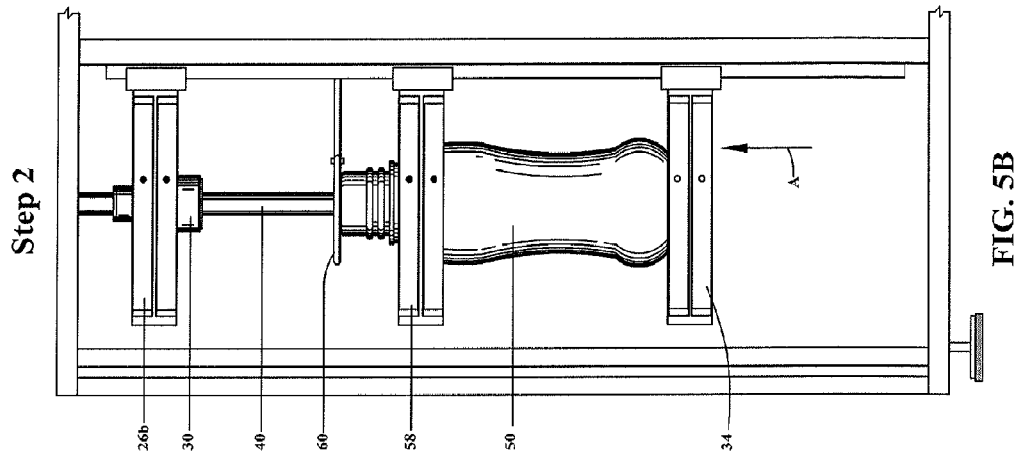
FIG. 5B illustrates the second step of the second exemplary embodiment of the process for reforming a portion of a plastic container according to the present invention.
Figure 5A:
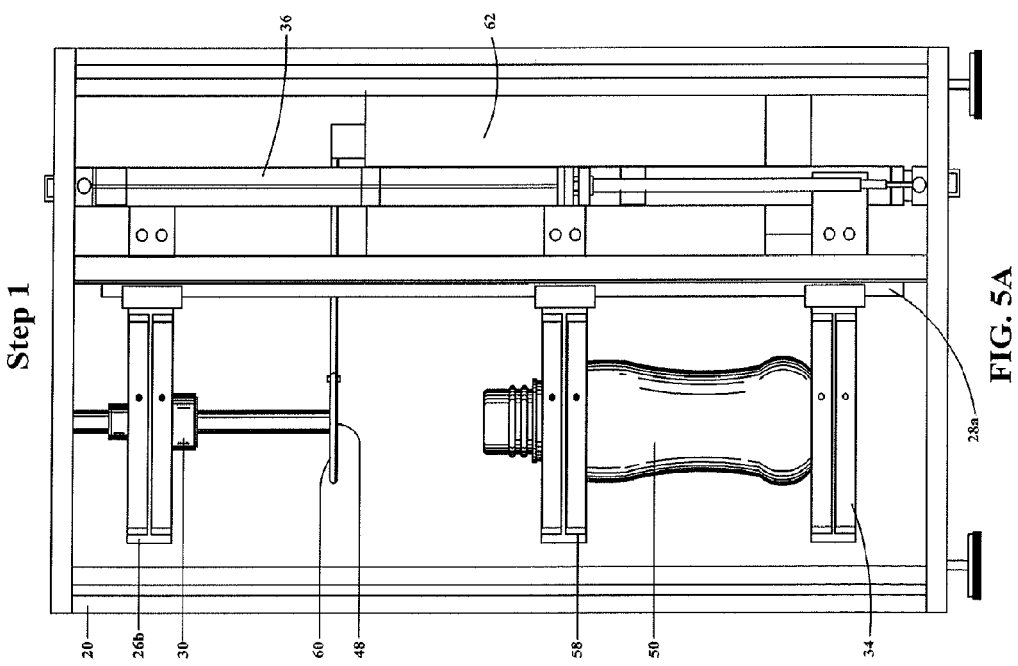
FIG. 5A illustrates the first step of a second exemplary embodiment of the process for reforming a portion of a plastic container according to the present invention.

The four-step embodiment of the process of reforming the plastic container 50 using the apparatus 10, 10' of the present invention is illustrated in FIGS. 5A-5D. Step 1 is illustrated in FIG. 5A. In Step 1, the plastic container 50 is loaded into the frame 20 of the apparatus 10, 10' using a conventional mechanism (e.g., a conveyor belt and funnel or pickup arm). The plastic container 50 may rest upon a base support 34 and be aligned by the alignment holder 58. As the plastic container 50 is loaded, the disk 48 of the workpiece support 40 is heated to its predetermined temperature via induction using the induction coil 60. By "predetermined" is meant determined beforehand, so that the predetermined temperature must be determined, i.e., chosen or at least known, before the process begins. An air cylinder 36 may be provided to drive the various cams (e.g., the second cam 26b) along the various slides (e.g., the first slide 28a).

Step 2 is illustrated in FIG. 5B. In Step 2, the plastic container 50 is raised (in the direction of arrow A) until the portion of the plastic container 50 to be heated (e.g., the upper portion 52) is located adjacent the disk 48. When so located, the heat emitted by the disk 48 softens the portion of the plastic container 50 desired to be reformed.

Figure 5D:
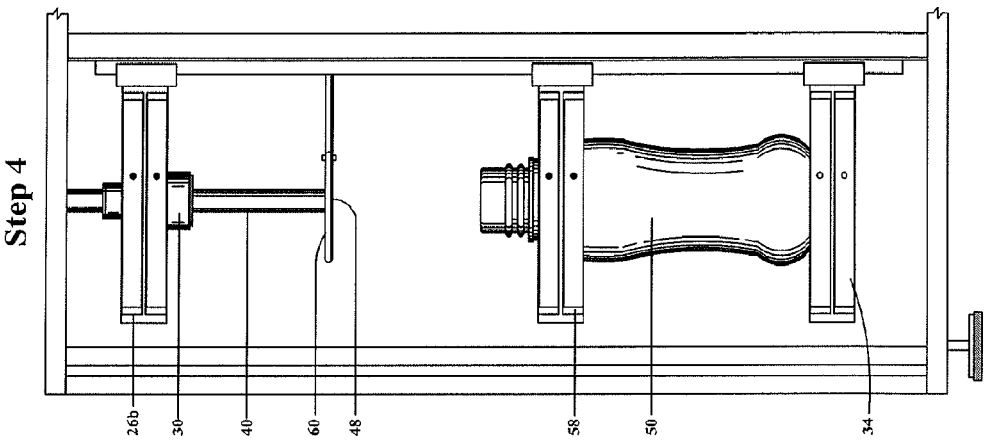
FIG. 5D illustrates the fourth step of the second exemplary embodiment of the process for reforming a portion of a plastic container according to the present invention.
Figure 5C:
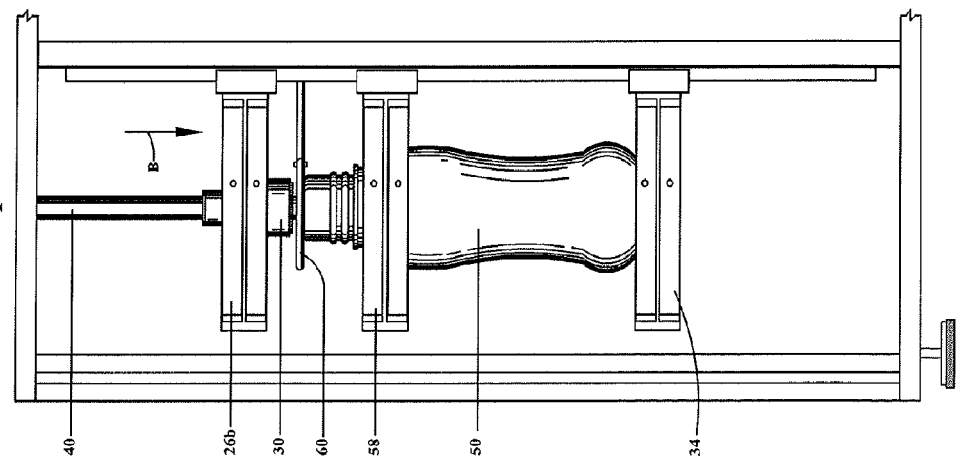
FIG. 5C illustrates the third step of the second exemplary embodiment of the process for reforming a portion of a plastic container according to the present invention.

Step 3 is illustrated in FIG. 5C. In Step 3, the forming die 30 is lowered (in the direction of arrow B) into position within the upper portion 52 of the plastic container 50 and the forming die 30 is activated. The forming die 30 forms the upper portion 52 of the plastic container 50, giving the plastic container 50 the desired neck finish. In the embodiment shown, the forming die 30 is chilled so that the forming die 30 cools the upper portion 52 simultaneously as it forms the upper portion 52.

Step 4 is illustrated in FIG. 5D. In Step 4, the forming die 30 is raised while the plastic container 50 is lowered so that the forming die 30 and the workpiece support 40 are removed from the upper portion 52 of the plastic container 50. The reformed plastic container 50 can then be removed from the apparatus 10, 10'. The apparatus 10, 10' is then ready to accept, and act upon, another plastic container 50.

C. The Application of Induction Heating

As discussed above, the present invention incorporates principles of induction heating. Induction heating is a method of providing fast, consistent heat for manufacturing applications which involve changing the properties of metals or other electrically conductive materials. The process relies on induced electrical currents within the material to produce heat. Although the basic principles of induction are well known, modern advances in solid state technology have made induction heating a remarkably simple, cost-effective method for applications which involve heating. See generally the website www.ameritherm.com of Ameritherm Inc. of Scottsville, N.Y., USA.

Using induction heating, an electrically conducting object (usually a metal) can be heated by electromagnetic induction. Two separate heating processes can come into play: eddy currents and magnetic hysteresis. Eddy currents are generated within the metal and resistance leads to Joule heating of the metal. An induction heater (for any process) consists of an electromagnet, through which a high-frequency AC is passed. Heat may also be generated by magnetic hysteresis losses in materials that have significant relative permeability. The frequency of the AC used depends on the object size, material type, coupling (between the induction coil and the object to be heated), and the penetration depth. Iron and its alloys respond best to induction heating, due to their ferromagnetic nature. Eddy currents can be generated in any conductor, however, and magnetic hysteresis can occur in any magnetic material.

Figure 6:
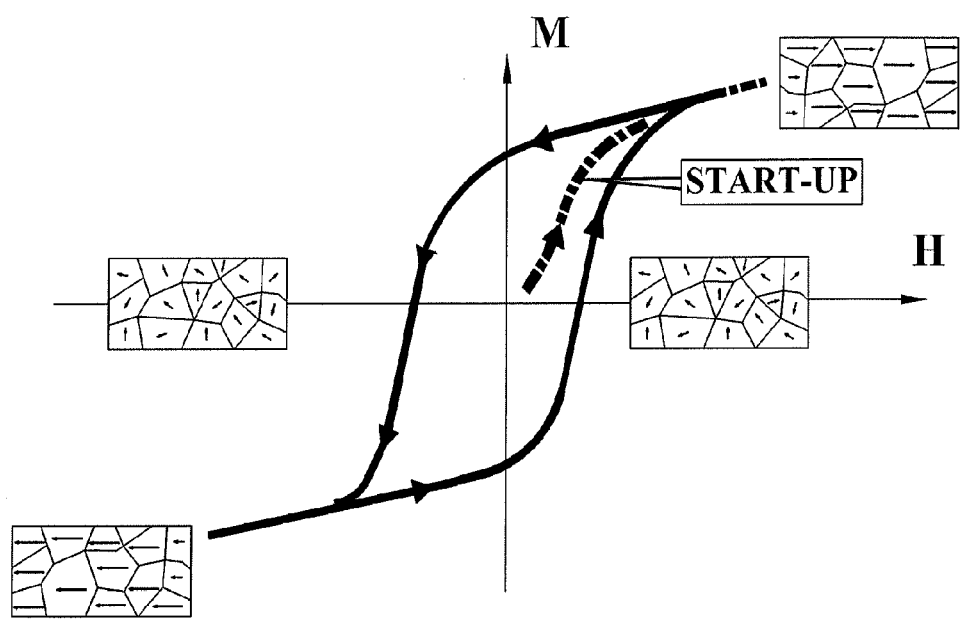
FIG. 6 illustrates the principle of magnetic hysteresis induction heating incorporated in the present invention.

The principle of magnetic hysteresis induction heating is illustrated in FIG. 6. FIG. 6 is a graph with the magnetization of the material (M) along the ordinate (vertical or "Y") axis and the applied magnetic field intensity (H) along the abscissa (horizontal or "X") axis. As shown by the boxes disposed along the H-axis, the electrons (represented by arrows) are randomly oriented absent imposition of a magnetic field. Upon start up, an induction field (magnetic field) emits a positive charge which forces positively charged electrons away from the field (see the oriented electrons in the top-right box of FIG. 6). Upon reversal of the induction field to a negative charge, at the bottom left of the graph, the positively charged electrons are attracted toward the field (see the oriented electrons in the bottom-left box of FIG. 6). By continuously changing the charge of the induction field (positive and negative), the movement of the electrons (from being pushed and pulled) causes friction heating at an atomic level. The loop depicted by the graph and formed by the reversal of field is the hysteresis loop.

The basic components of an induction heating system are an AC power supply (incorporated in the induction workhead 62), an induction coil 60, and a workpiece (i.e., the material to be heated such as the rod 46 or the disk 48). The power supply of the induction workhead 62 sends alternating current through the induction coil 62, generating a magnetic field. The AC power supply provides electricity with low voltage but very high current and high frequency. When the workpiece 46, 48 is placed in the induction coil 60, which is driven by the power supply, the magnetic field induces eddy currents in the workpiece 46, 48, generating precise amounts of clean, localized heat without any physical contact between the induction coil 60 and the workpiece 46, 48.

There is a relationship between the frequency of the magnetic field and the depth to which it penetrates the workpiece 46, 48. Low frequencies (5-30 kHz) are effective for thicker workpiece materials requiring deep heat penetration; higher frequencies (100 to 400 kHz) are effective for smaller workpiece materials or shallow penetration; and the highest frequencies (e.g., 480 kHz) are effective for microscopic workpiece materials. The higher the frequency, the higher is the heat rate. Therefore, the process designer can modify the thickness of certain portions of the container 50 to coordinate that thickness with the reform process parameters and achieve desired results.

Figure 7A:
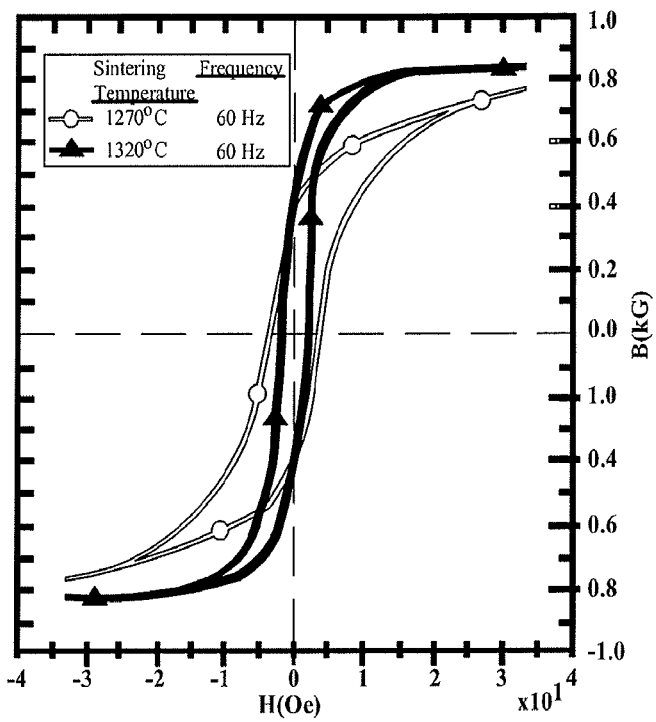
FIGS. 7A and 7B show the affects of different induction frequencies on a magnetic object subjected to the induction (magnetic) field.
Figure 7B:
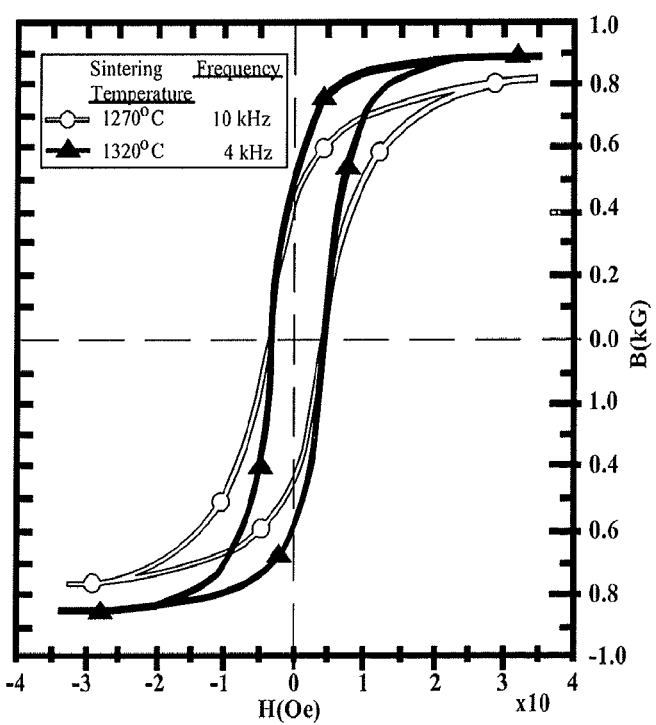

FIGS. 7A and 7B show the affects of different induction frequencies on a magnetic object subjected to the induction (magnetic) field. The total area within the hysteresis loop represents the amount of energy (heat) that is absorbed by the object (e.g., the workpiece 46, 48). By optimizing the induction field frequency, the amount of heat that goes into the workpiece 46, 48 can be increased. The result is a reduction in warm-up time, permitting use of a smaller induction workhead 62 and reducing cost.

Due to the effects of hysteresis, magnetic materials are easier to heat than non-magnetic materials via induction heating. Magnetic materials naturally resist the rapidly changing magnetic fields within the induction coil 60. The resulting friction produces hysteresis heating in addition to eddy current heating. A metal which offers high resistance is said to have high magnetic permeability which can vary from 100 to 500 for magnetic materials; non-magnetic materials have a permeability of 1.

Figure 8:
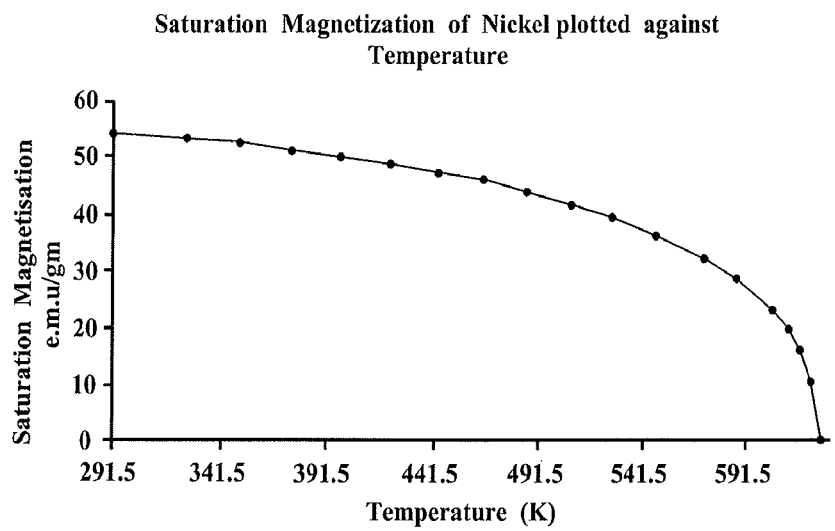
FIG. 8 illustrates how the magnetic characteristic of an example material (nickel) approaches zero (non-magnetic) as it increases in temperature.
Figure 9:
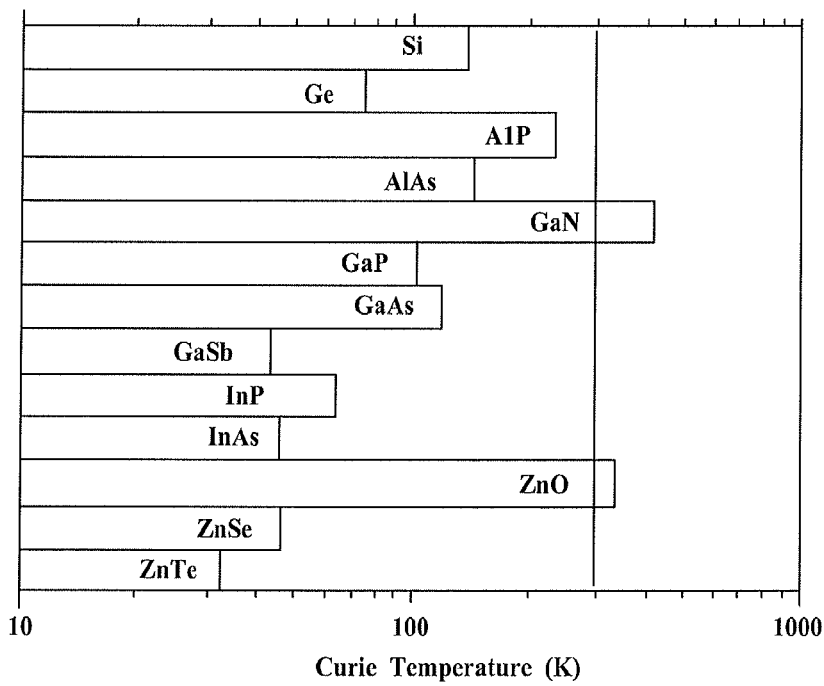
FIG. 9 shows that different materials have different Curie points.

FIG. 8 illustrates how the magnetic characteristic of an example material (nickel) approaches zero (non-magnetic) as it increases in temperature. The temperature at which a magnetic material loses its magnetic properties and becomes non-magnetic is known as the "Curie" point of the material. Hysteresis heating occurs at temperatures below the "Curie" point of the material. FIG. 9 shows that different materials have different Curie points. By selecting for the workpiece 46, 48 a material with a high Curie point, the cycle time of the reformation process of the present invention can be reduced. (Of course, this is true up to a specific temperature determined by the plastic material being heated; once above this temperature the material may catch fire rather then soften.)

The induced current flow within the workpiece 46, 48 is most intense on the surface, and decays rapidly below the surface. Thus, the outside will heat more quickly than the inside; about 80% of the heat produced in the workpiece 46, 48 is produced in the outer "skin." This is described as the "skin depth" of the workpiece 46, 48. The skin depth decreases when resistivity decreases, permeability increases, or frequency increases.

In summary, high permeability and temperatures below the Curie temperature in the workpiece 46, 48 are useful. Temperature difference, mass, and specific heat also influence the heating of the workpiece 46, 48. The energy transfer of induction heating is coupled to the distance between the induction coil 60 and the workpiece 46, 48. Energy losses occur through heat conduction from the workpiece 46, 48 to the workpiece support 40, natural convection, and thermal radiation. Among the characteristics that must be considered for a particular application are: the degree of temperature change required; the mass, thickness, specific heat, and electrical properties of the workpiece 46, 48; the coupling efficiency of the design of the induction coil 60; and thermal losses due to conduction of heat into the workpiece support 40, convection, and radiation. A suitable induction coil 60 for certain applications may be made of 3.175-4.7625 mm diameter copper tubing and fluid cooled. The diameter, shape, and number of turns influence the efficiency and field pattern.

A wide range of materials may be suitable to form the workpiece 46, 48 depending upon a particular application. Iron is one suitable material. It might also be possible, in some applications, to create a hybrid or composite workpiece 46, 48: a plastic or ceramic workpiece 46, 48 having a band or core of a metal such as iron.

The apparatus 10, 10' of the present invention replaces the IR lamps and heater bands of conventional reforming machinery with induction heating. Such replacement reduces the cost and complexity of the reforming machine considerably. Specifically, the cost of the apparatus 10, 10' used to implement the induction-heating process of the present invention is about one-half the cost of the conventional machine incorporating IR lamps or heater bands.

D. Process Optimization

It is difficult to move large amounts of plastic at a high rate of speed. Long cycle times conventionally result in large, high-cost machines to keep up with modern blow molding production equipment. Therefore, as stated above, an object of the present invention is to improve overall cycle times, required to reform packages such as plastic containers 50, by reducing the heating and cooling processes. The heating process is reduced by increasing the maximum temperature of the heated workpiece 46, 48 (of course, as stated above, up to a point). The cooling process is reduced by reducing the temperature of the forming die 30. The result is an increase in the speed of production output.

Figure 10A:
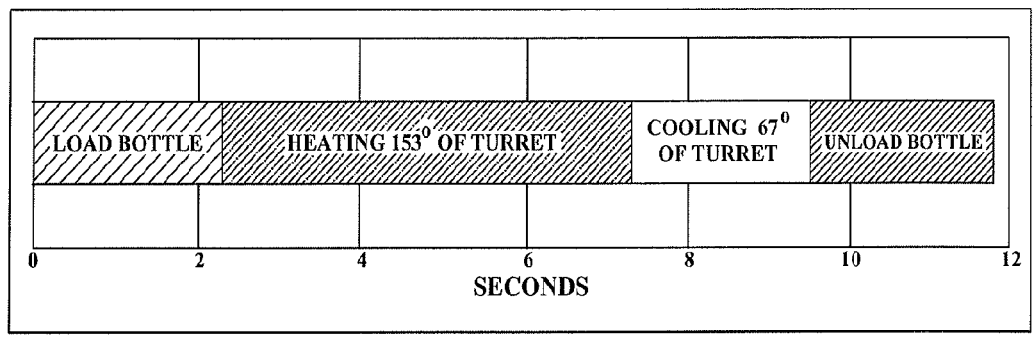
FIG. 10A is a timeline showing the length of time required to complete each of the four basic steps of the process of the present invention.
Figure 10B:
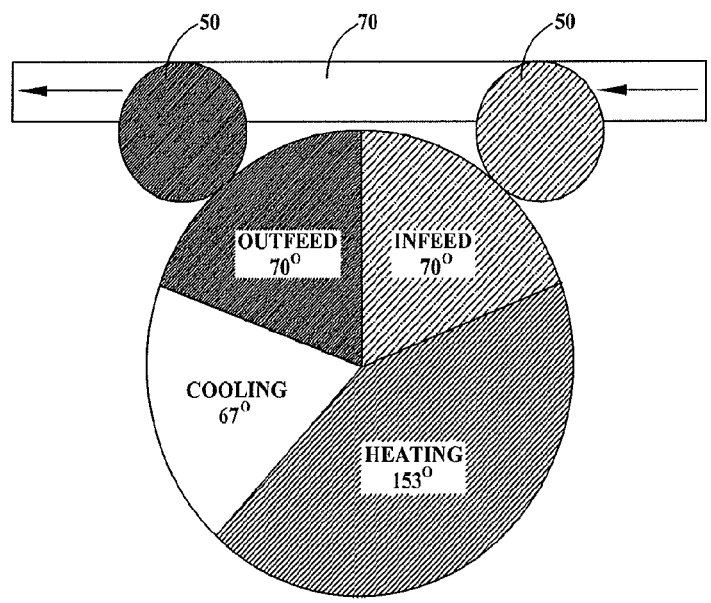
FIG. 10B is a schematic that shows (a) delivery by a conveyor of a plastic container to the apparatus of the present invention, (b) the amount of the full (360 degrees) rotation of the apparatus required to complete each of the four basic steps of the process of the present invention, and (c) delivery by the apparatus to the conveyor of the reformed plastic container.

FIGS. 10A and 10B illustrate the cycle time achieved using the present invention in one particular application. FIG. 10A is a timeline showing the length of time required to complete each of the four basic steps of the process of the present invention: infeed of the plastic container 50, heating of the workpiece 46, 48 by induction and then heating of the portion of the plastic container 50 to be reformed, reforming and cooling of the plastic container 50, and outfeed of the reformed plastic container 50. FIG. 10B is a schematic that shows (a) delivery by a conveyor 70 of the plastic container 50 to the apparatus 10, 10' of the present invention, (b) the amount of the full (360 degrees) rotation of the apparatus 10, 10' required to complete each of the four basic steps of the process, and (c) delivery by the apparatus 10, 10' to the conveyor 70 of the reformed plastic container 50.

FIGS. 10A and 10B show that, for this particular application, about 20% and just over 2 seconds of the cycle was required to complete each of the infeed, cooling, and outfeed steps. Just over 40% and about 5 seconds of the cycle were required to complete the heating step of the process. In this example, a total cycle time of just less than 12 seconds was achieved. More specifically, roughly 7 seconds was required to heat the plastic, reform it into the desired shape, and cool it.

Induction heating also reduces cycle times because the heat is transferred to a precise area of the package so that the area can be reformed within efficient cycle times. Induction can heat a metal workpiece (such as rod 46 or disk 48) quickly to temperatures above 1,400° F. The metal workpiece then transfers its heat to the plastic container 50 via radiation and convection. Induction heating allows the heat energy to be channeled, focused, or directed to a precise area of a package to heat the area while leaving the remainder of the package relatively unheated. The precise area to be heated can be adjusted by, among other things, changing the design (e.g., thickness or geometry) of the workpiece 46, 48. Alternatively, or in addition, a heat-reflecting mask or an insulator could be applied to the container 50 to preclude or minimize heating of a particular masked or insulated region of the container 50.

Finally, although the focus of the present invention is on reforming the containers 50 to overcome discontinuities 112 and other blemishes characteristic of the containers 50 after certain prior processing steps, the invention is not so limited. For example, the induction heating of the present invention could selectively heat a portion of the container 50 to define the material properties of that portion. Such material properties could include crystallinity, hardness, stiffness, and the like. Thus, the material properties of one portion of the container 50 might differ from those of other portions of the same container 50.

E. Continuous Reform Machine

Figure 11:
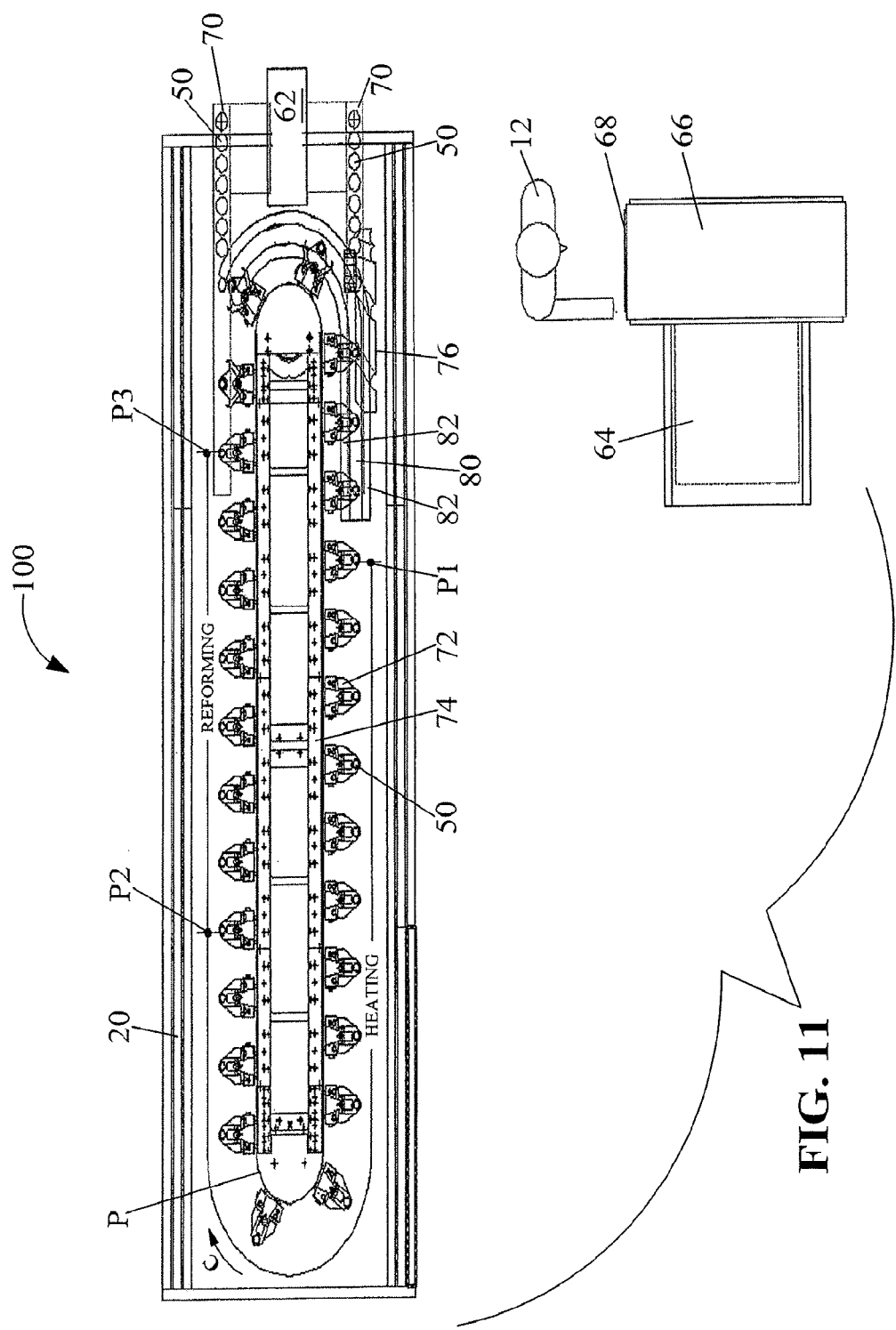
FIG. 11 illustrates the layout in a top view of a continuous-motion reform machine according to another embodiment of the present invention.

Illustrated in FIG. 11 is the layout of a continuous-motion reform machine 100 according to another embodiment of the present invention. The machine 100 is adapted to be used in a commercial, production environment to reform multiple plastic containers 50. The machine 100 has a plurality of reform stations 72 disposed on a moving carrier 74 disposed on the stationary frame 20. Twenty-eight reform stations 72 are shown in FIG. 11; a greater or lesser number of reform stations (such as fourteen reform stations) are suitable depending upon the production application. The reform stations 72 are fixed in position relative to the carrier 74. In this embodiment, each reform station 72 includes the neck clamp 22, the forming die 30, the workpiece support 40, and the workpiece (illustrated as the disk 48, for example).

The user or operator 12 can control the functions of the machine 100. As shown in FIG. 11, the operator 12 interacts with an interface 66 which, in turn, is connected to the PLC 64. The operator 12 can input instructions to, and receive information from, the PLC through a touch screen monitor 68.

The PLC 64 is a microprocessor-based device that executes resident software controlling the functional operation of the machine 100. (Suitable substitutes for the PLC 64, such as a personal computer, would be known to an artisan.) Communication between the various machine elements and the PLC 64 may be by wire, by wireless, or by a combination of both wire and wireless communications. Wireless communications are especially advantageous for controlling components on rotating machinery, such as the machine 100, because these communications avoid the need for complex rotary contacts to transmit electrical signals across rotary interfaces where components are moving relative to one another. Feedback to the PLC 64 is provided by various sensors such as micro switches and optical sensors deployed and positioned as required to provide positional information and other status-related information.

Held on the frame 20, the carrier 74 moves the reform stations 72 around a closed path P in a clockwise direction (i.e., along the direction of arrow C). Preferably, the path P is oval, rather than circular or some other shape. Although round or other shapes are possible, one advantage of the oval construction is that the number of reform stations 72 on the machine 100 can be increased or decreased relatively easily to achieve a specific output. Output is determined by heat conditioning time and cooling time. By using an oval path P, the length of the machine 100 can be increased to add reform stations 72 with little redesign. If the path P were round or circular in shape, such a revision would require additional design time because adding more reform stations 72 increases the diameter of the path P and the turret defining the path P. Larger turrets mean larger loads which means the bearings and framing need to be redesign accordingly.

The input conveyor 70 delivers the container 50, desired to be reformed, to a feed screw 76. The feed screw 76 removes the container 50 from the conveyor 70 and positions the container 50 to be grasped by the next available reform station 72 as the reform stations 72 rotate about the path P. Specifically, the neck clamp 22 of the next available reform station 72 engages and grasps the container 50, and removes the container 50 from the feed screw 76.

Figure 15:
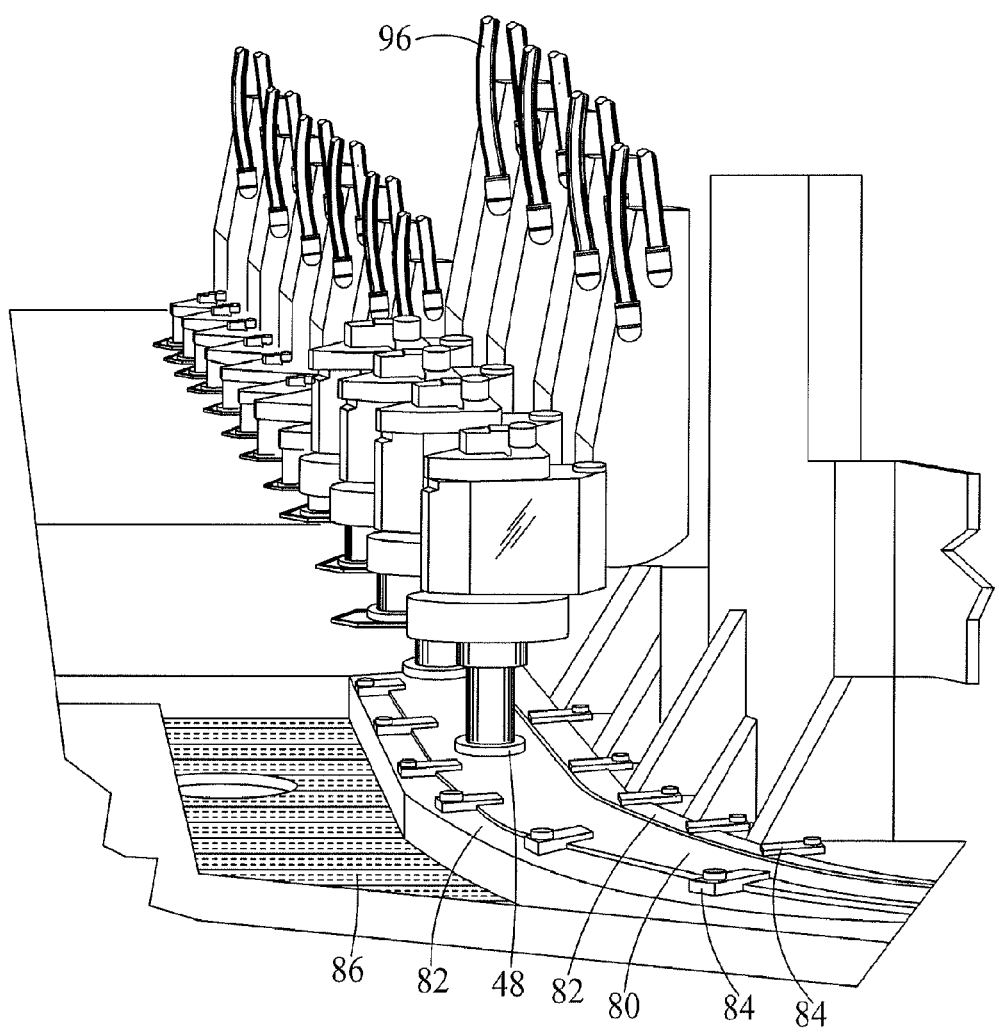
FIG. 15 is a perspective view of the reform machine illustrated in FIG. 11, highlighting the induction track.

The path P may be divided (conceptually, rather than physically) into sections by transition points P1, P2, and P3. Just before the transition point P1, the path P includes an induction section formed by an induction track 80. The induction track 80 has a pair of curved, parallel track walls 82 held in position by a series of blocks 84 (see FIG. 15). The walls 82 are preferably formed by copper tubing, and may have cooling water running through the internal orifice of the walls 82. The blocks 84 are also preferably formed of copper. The blocks 84 hold the track 80 in position on a fiberglass board 86, which prevents the magnetic field created by the track 80 from heating other metal objects proximate the track 80. The induction workhead 62 is connected to the induction track 80 and has an AC power supply. As described above, the induction workhead 62 creates a magnetic field in the track 80 such that the disk 48 is heated when it passes through the magnetic field of the track 80 (see FIG. 15). Noteworthy is that the track 80 is not an indexing coil; rather, the track 80 permits continuous motion as the disk 48 is heated.

Figure 12:
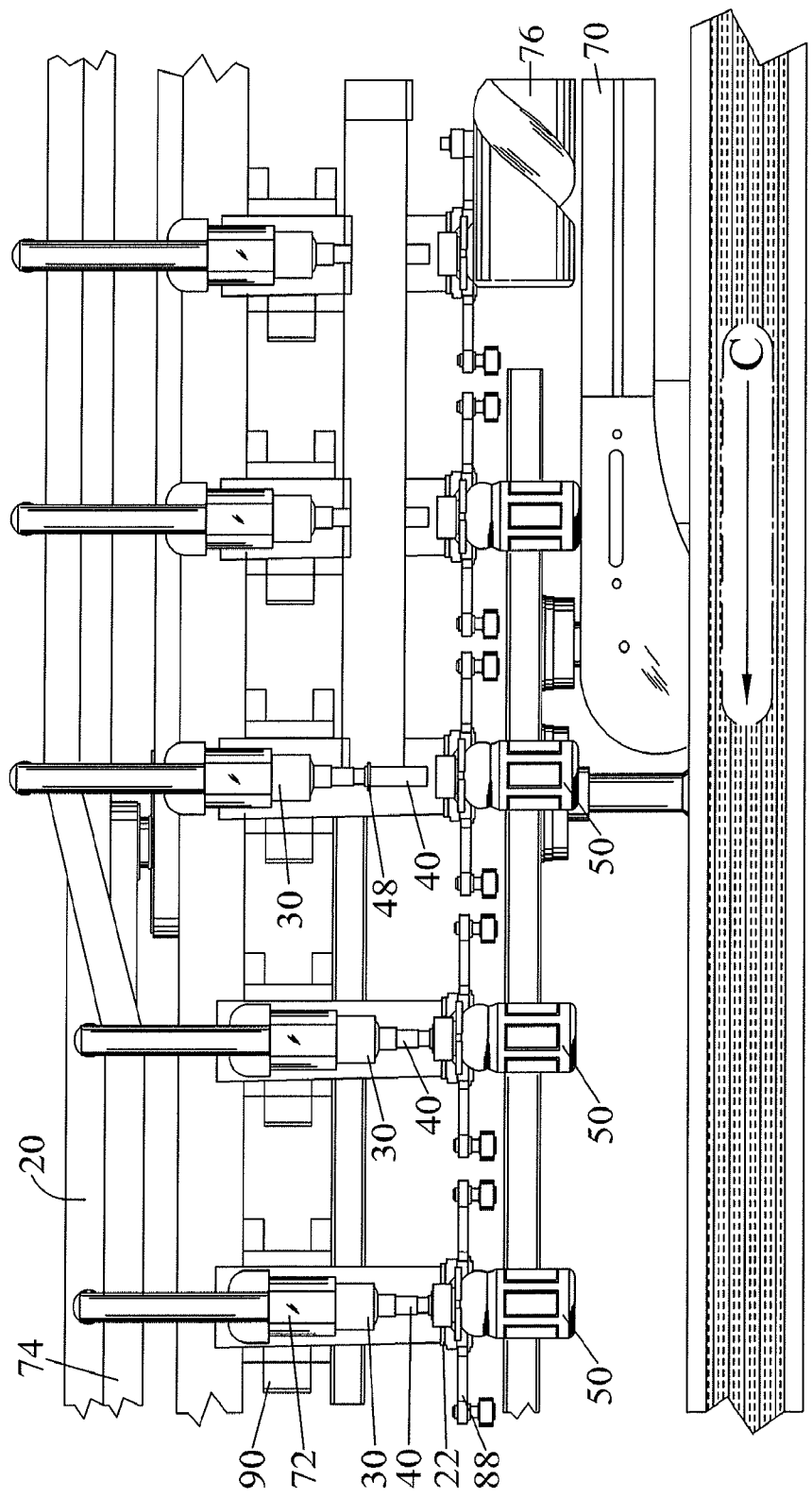
FIG. 12 illustrates, in detail, a first transition point in the path traveled by the reform stations of the reform machine illustrated in FIG. 11.

At the transition point P1, illustrated in detail in FIG. 12, the reform station 72 and its disk 48 exit the track 80 with the disk 48 in a heated state (i.e., at a temperature of about 1,400-1,500° F.). A lower cam mechanism 88 activates the neck clamp 22, so that the neck clamp 22 grasps the container 50 from the feed screw 76 and positions the container 50 proximate the heated disk 48. Then an upper cam mechanism 90 lowers the heated disk 48 into position adjacent the portion of the container 50 to be heated (softened) and reformed. Between the transition point P1 and the transition point P2, which may be called the "heating" section of the path P, the disk 48 remains in position to heat the container 50. Typically, the reform station 72 takes about 3 seconds to travel from the transition point P1 to the transition point P2—although that time may vary depending upon the application.

Figure 13:
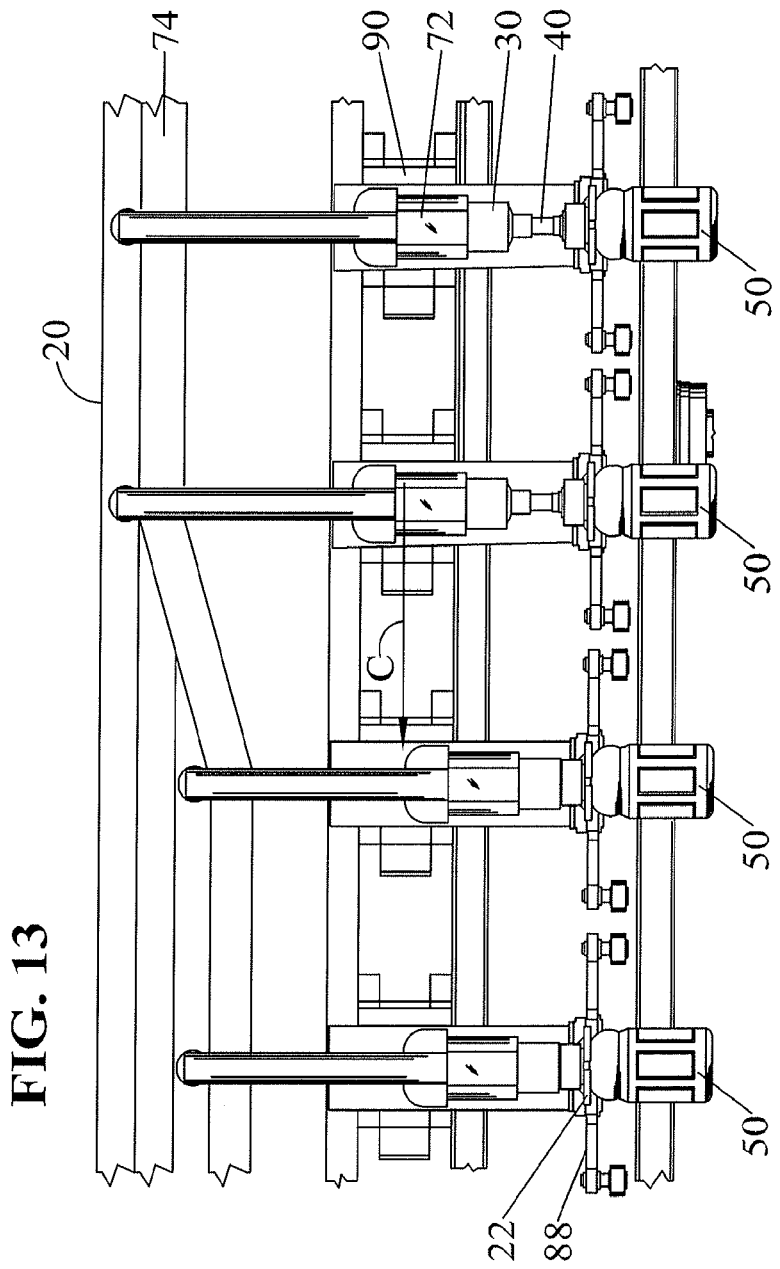
FIG. 13 illustrates, in detail, a second transition point in the path traveled by the reform stations of the reform machine illustrated in FIG. 11.

At the transition point P2, illustrated in detail in FIG. 13, the upper cam mechanism 90 lowers the forming die 30 into contact with the softened portion of the container 50. That action also lowers the disk 48 further into the body 54 of the container 50. (Alternatively, in another embodiment, the disk 48 might be moved upward and away from the container 50 before the forming die 30 is lowered into contact with the container 50.) Between the transition point P2 and the transition point P3, which may be called the "reforming" section of the path P, the forming die 30 remains in position to reform the container 50. Typically, the reform station 72 takes about 1.5 seconds to travel from the transition point P2 to the transition point P3—although that time may vary depending upon the application. Both the disk 48 and the container 50 begin to lose heat and to cool as they travel along the reforming section.

Figure 14:
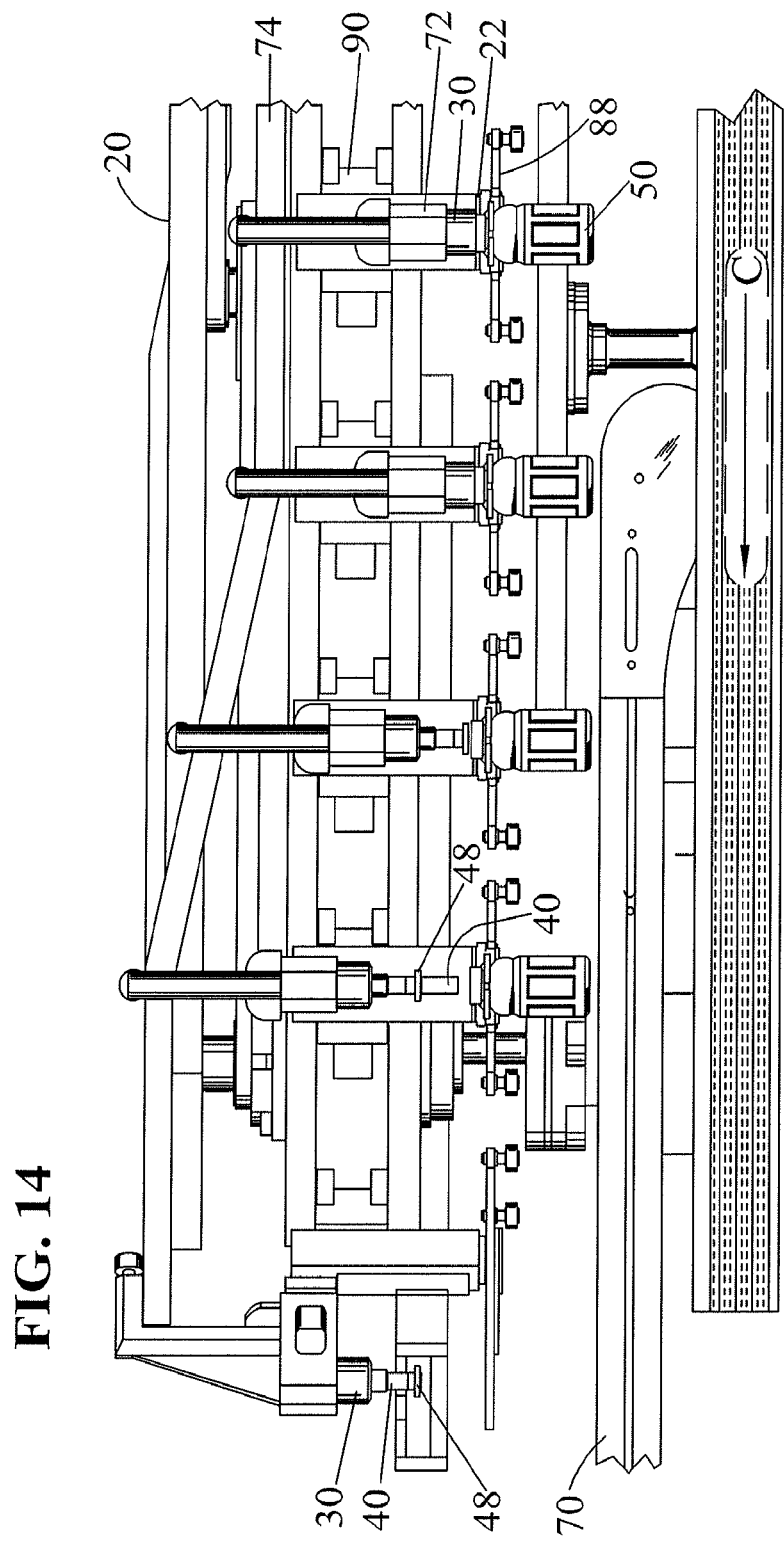
FIG. 14 illustrates, in detail, a third transition point in the path traveled by the reform stations of the reform machine illustrated in FIG. 11.

When the reform station 72 reaches the transition point P3 in the path P, illustrated in detail in FIG. 14, the upper cam mechanism 90 raises the forming die 30, the disk 48, and the workpiece support 40 out of the container 50. Concurrently, the lower cam mechanism 88 opens the neck clamp 22 to release the container 50 onto the output conveyor 70 and complete the induction reforming process. A second feed screw (not shown) may ensure that the container 50 is removed from the neck clamp 22 and reduce the pitch of the container 50 from about 22.9 cm (9 inches) to about 11.4 cm (4.5 inches). This section of the path P can be called the output section.

As shown in FIG. 14, after the container 50 is placed on the output conveyor 70, the reform station 72 leaves the output section and turns once again into the induction section of the path P. The disk 48 typically has cooled from the temperature of about 1,400-1,500° F., attained when the disk 48 departed the induction track 80 and entered the heating section of the path P, to a temperature of about 1,200° F. as the disk 48 re-enters the induction section of the path P. Typically, the reform station 72 takes about 0.6 seconds to travel the induction section, i.e., it takes about 0.6 seconds for the induction track 80 to reheat the disk 48 from about 1,200° F. to about 1,400-1,500° F. (Note that the disk 48 can initially be heated from room temperature to about 1,400-1,500° F. in about 15-60 seconds using the induction heating of the present invention.)

In summary, sections of the path P include an induction section for heating the workpiece (e.g., the disk 48), a heating section for softening the portion of the container to be reformed, a reforming section where the forming die engages the portion to be reformed, and an output section where the reformed container leaves the machine 100 and the reform station 72 returns to the induction section. The continuous, endless, closed-loop, cyclic movement of the reform stations 72 about the path P achieves a practical, cost effective, reforming process.

Figure 16:
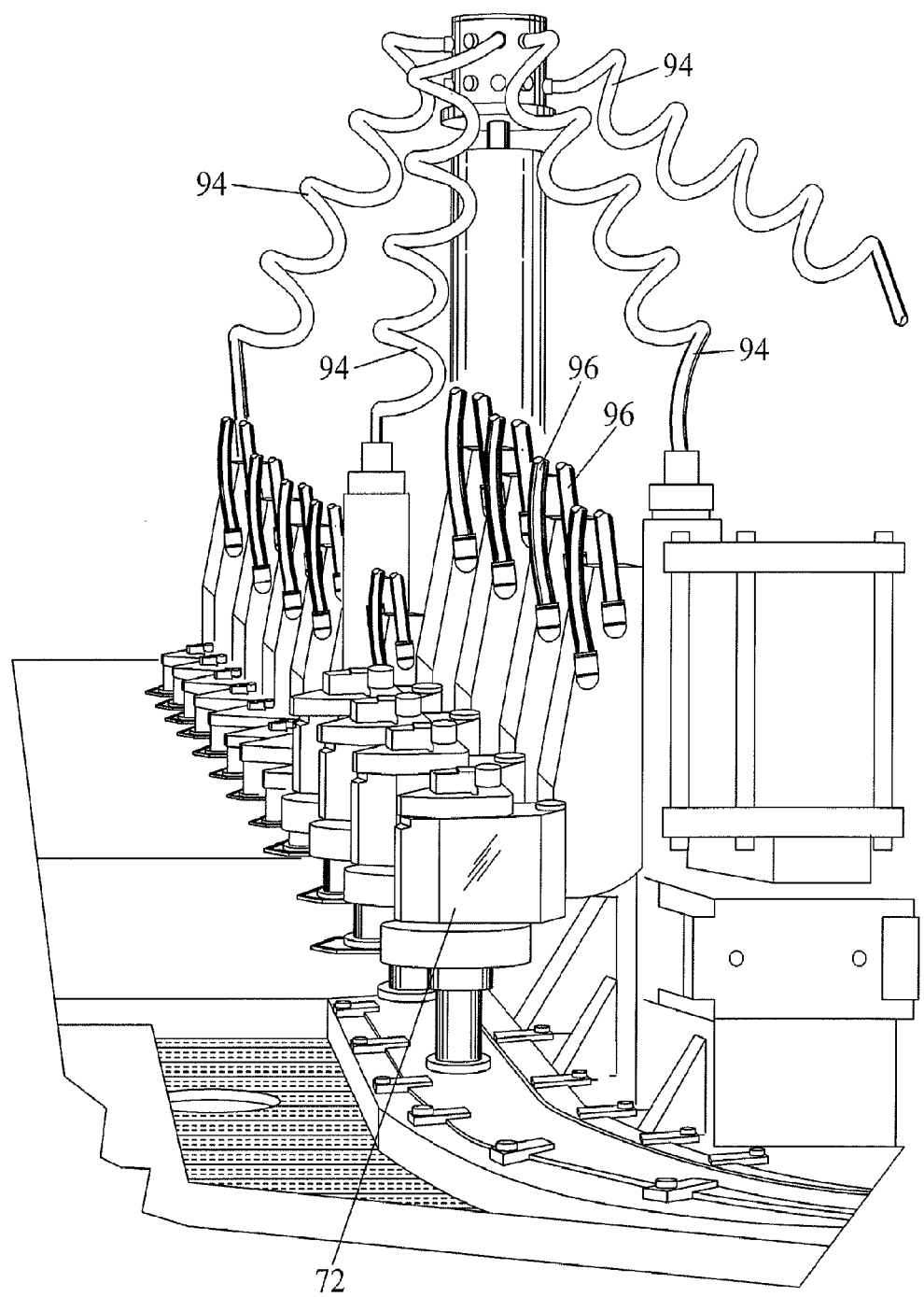
FIG. 16 is a perspective view of the reform machine illustrated in FIG. 11, highlighting the cooling system.

The machine 100 also includes a cooling system which delivers a coolant (preferably, water) to each of the reform stations 72. As shown in FIG. 16, the cooling system includes a cooling tower 92 that provides a source of the coolant. The cooling system also includes a plurality of flexible tubes 94 (four are illustrated): two of the tubes 94 deliver coolant to the reform stations 72 and two of the tubes remove the coolant from the reform stations 72. The tubes 94 are flexible to permit movement of the reform stations 72 around the path P. A plurality of hoses 96 are provided at each reform station 72 to deliver coolant to, and remove coolant from, the forming die 30. The hoses 96 are also flexible to permit movement of the components to which the hoses 96 are attached.

Figure 17:
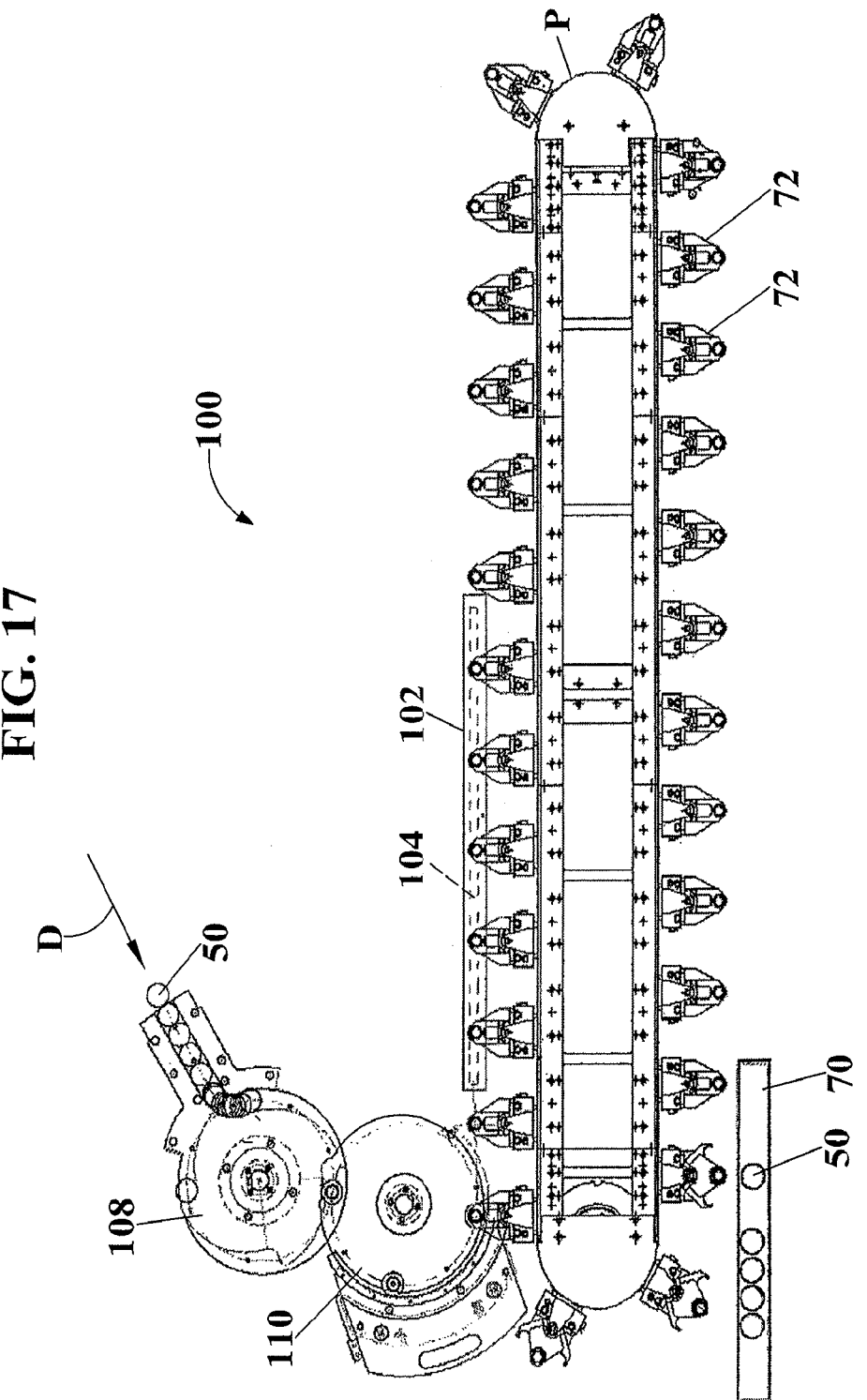
FIG. 17 illustrates the layout in a front view of a continuous-motion reform machine according to yet another embodiment of the present invention.

FIG. 17 illustrates the layout of another embodiment of the machine 100 of the present invention. In the illustrated embodiment, a flat induction heater plate 102 replaces the disk 48. The reform stations 72 travel around the path P as for the embodiment described earlier. The containers 50 are delivered to an infeed turret 108 along the direction of arrow D. The infeed turret 108 delivers the containers 50, in turn, to a trimming turret 110 where the containers 50 are trimmed. Typically, the trimming turret 110 includes a continuous-motion trimmer, a guillotine blade, or another conventional mechanism (not shown) that performs the trimming operation. The trimming operation often leaves the TSS of the container 50 with a discontinuity 112 (such as a projection, a sharp edge, or the like, as depicted in FIG. 19); in other words, the TSS of the container 50 is uneven. It is desired that the TSS be flat.

The reforming operation performed by the machine 100 can correct the problem by removing the discontinuity 112 and flattening the TSS. Neither the foot 44 nor the disk 48 are needed to heat a portion of the container 50 below the TSS to correct the problem of an uneven TSS; rather, the plate 102 suffices. As shown in FIG. 17, the plate 102 is provided along a predetermined distance of the path P. The length of the plate 102 is selected so that each container 50 travels under the plate 102 a sufficient time to achieve the desired amount of heat transfer from the plate 102 to the TSS of the container 50. The plate 102 is made of a material that heats to a temperature of about 1,400-1,500° F. and that has a relatively even or uniform distribution of heat. The plate 102 has a plurality of heating rods 104 (only one is illustrated) inserted into holes formed in the plate 102. The rods 104 are connected to the induction workhead 62 and receive alternating current from the induction workhead 62, thereby creating the magnetic field that heats the plate 102 (i.e., the workpiece in this embodiment) by induction. The plate 102 has a thickness of about 2.5 to 3.1 cm (or 1.0 to 1.25 inches) and is rectangular in shape. Once reformed, the containers 50 exit the machine 100 on the output conveyor 70.

Figure 18A:
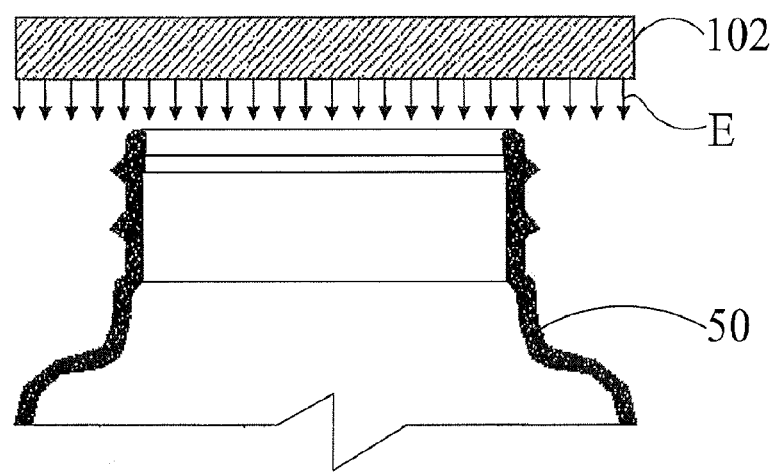
FIG. 18A is a schematic view depicting the plate of the reform machine illustrated in FIG. 17 radiating heat in the direction of a container to be reformed.
Figure 18B:
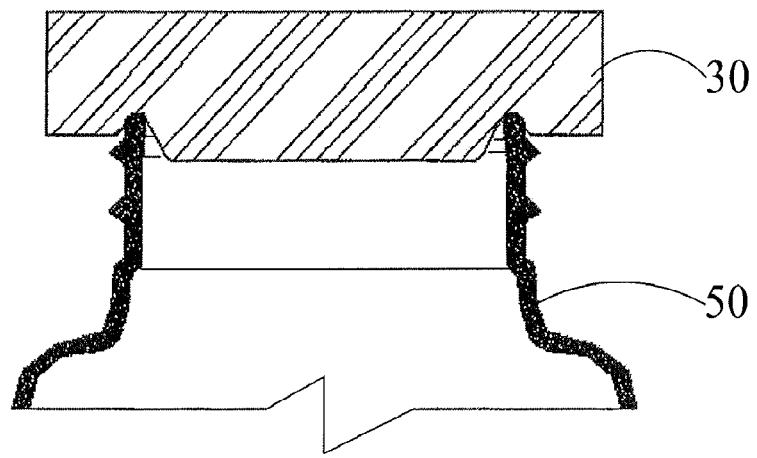
FIG. 18B is a schematic view depicting the forming die of the reform machine illustrated in FIG. 17 engaging the container.

FIGS. 18A and 18B illustrate, in schematic form, the operation of the plate 102 in correcting the discontinuity 112. In FIG. 18A, the plate 102 radiates heat in the direction of arrows E toward the TSS of the container 50. Once the TSS is softened, the forming die 30 engages the TSS of the container 50 to reform the TSS—as shown in FIG. 18B. FIG. 19 depicts the correction by focusing (see the circles of the magnified views presented) on the TSS of the container 50 both before (left) and after (right) the container 50 is reformed. The left-hand side of FIG. 19 shows that the container 50 has a discontinuity 112; the right-hand side of FIG. 19 shows that the discontinuity 112 has been overcome, yielding the flat TSS 114 as desired.

Figure 20:
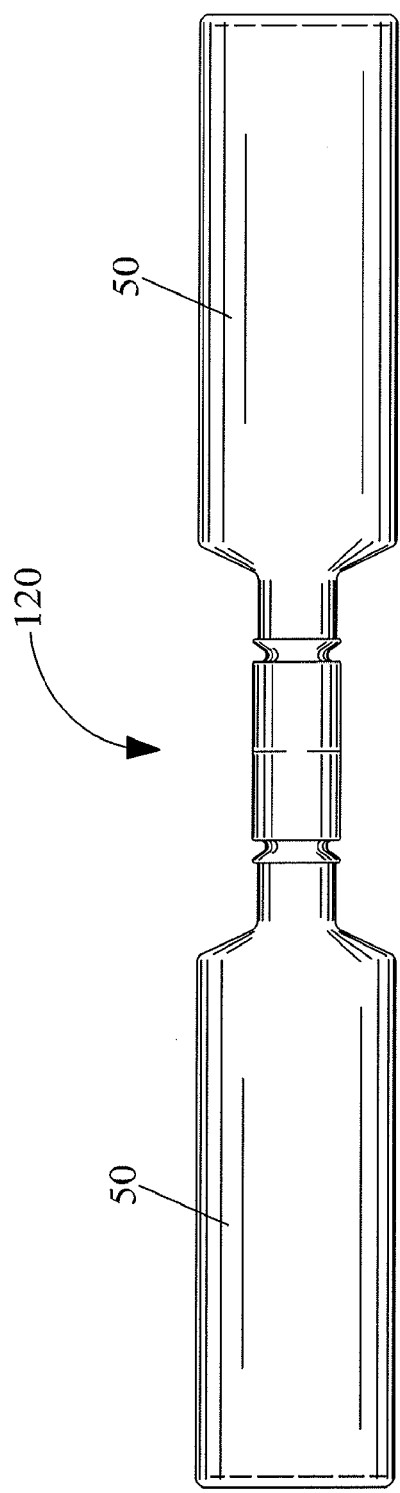
FIG. 20 illustrates a typical intermediate plastic product created by a conventional container-molding apparatus, with two containers molded together head-to-head into single plastic unit.

FIG. 20 illustrates a typical intermediate plastic product created by a conventional container-molding apparatus. Two containers 50 are initially molded together head-to-head into single plastic unit 120. Using an embodiment of the machine 100 according to the present invention, the two steps necessary to (a) slice the unit 120 into two, separate containers 50; and (b) reform the containers 50 to remove unwanted discontinuities 112 can be performed sequentially on one machine 100 using induction heating.

Figure 21:
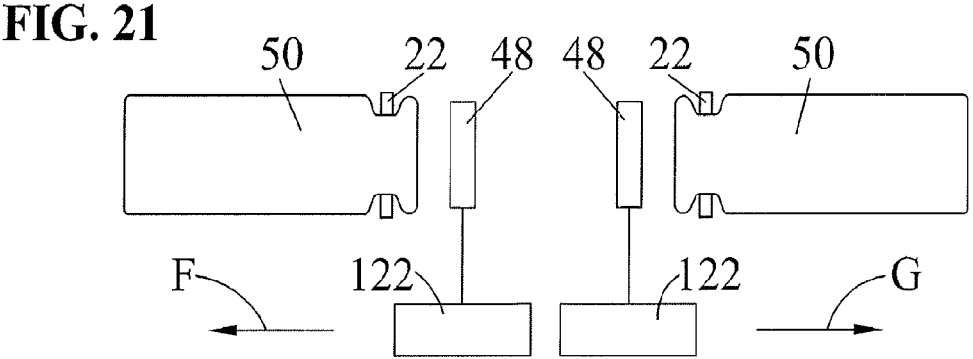
FIG. 21 is a schematic view illustrating the application of induction heating to the separated containers cut from the single plastic unit shown in FIG. 20.

Referring to FIG. 21, the single plastic unit 120 is delivered to the machine 100. The single plastic unit 120 is then sliced into its separate containers 50 in the trimming turret 110 (or a similar device, as would be known by an artisan). Separate neck clamps 22 then grasp the respective containers 50 as induction-heated disks 48 are brought adjacent each of the containers 50 (as shown in FIG. 21). A pair of slides 122 move the disks 48 into proximity with the containers 50 along the directions of arrows F and G, respectively, and then out of proximity by a reverse movement. Once the containers 50 are softened, a forming die 30 can engage and reform the containers 50 (as described above).

In certain applications, a forming die 30 may not be necessary to reform the container 50. For example, the discontinuity 112 may be a sharp edge created during the slicing operation. The application of directed heat to the container 50 may cause the sharp edge to bead into a ball without using additional reforming structures.

In other applications, it may be possible to couple the molding process with the reforming process of the present invention. Typically, the containers 50 (which require reforming) exit the mold with retained, latent heat that was applied during the process of molding the containers 50. Such latent heat can be used to advantage, increasing efficiency and decreasing cycle time, if the reforming process begins shortly after the container 50 exits its mold. Specifically, the induction-heated workpiece (e.g., the disk 48) will take less time to bring the container 50 up to the predetermined reforming temperature for a heated container 50 just out of the mold than for a cooled container 50.

For example, in one application, the reforming process requires the container 50 to have a temperature circa 200-230° F. This temperature range suffices to allow rapid movement of the plastic, and speeds processing. The range is below the temperature at which the plastic deforms, however, and below the temperature at which the plastic tends to stick to tools. If the container 50 were to exit its mold at 200° F., then little or no additional heat would be required from the workpiece.

F. Exemplary Applications

The induction heating of the apparatus 10, 10' and of the reform machine 100, and the method of the present invention, increases the amount of plastic that can be manipulated in a practical cycle time. This advantage is in contrast to the conventional burnishing process, which is unable to manipulate significant amounts of plastic quickly. In addition, burnishing is typically limited to round packages and only focuses on the neck finish of the plastic package. The invention can reshape non-round neck finishes, convert round finishes to non-round finishes, and manipulate other areas of the package (i.e., the invention is not limited to the neck finish region of the package). Therefore, the apparatus 10, 10', the reform machine 100, and the method of the present invention expand the feasible applications of reforming technology. The following examples of applications are included to more clearly demonstrate the overall nature of the invention. These examples are exemplary, not restrictive, of the invention.

FIGS. 22A and 22B show that the apparatus 10, 10', the reform machine 100, and the method of the present invention can facilitate spin trim to form a smooth TSS or a bullet finish, respectively. As illustrated by FIG. 22C, the apparatus 10, 10', the reform machine 100, and the method of the present invention can apply a calibrated neck finish, for plug seals, to a blow-molded package. FIGS. 22D and 22E show that the forming die 30 of the present invention can form just about any desired custom feature (e.g., the pour feature illustrated in FIG. 22D) on a plastic package. Such formation eliminates cutting operations and removal of cut plastic trim.

Several particular custom features warrant highlighting. The apparatus 10, 10', the reform machine 100, and the method of the present invention can add unique three-dimensional features, by including an imprinted or embossed characteristic on the contact surface of the forming die 30, during modification of a molded plastic package. Such features provide a mechanism for detecting counterfeit packages or altering the aesthetic appearance of the package.

Likewise, a transferable element can be added to a plastic package, during modification of a molded portion of the package, by including a transferable element on the contact surface of the forming die 30. Such a transferable element (e.g., a decorative particle) can alter the aesthetic appearance of the package. The transferable element (e.g., a radio frequency identification or RFID device) can also provide a feature for detecting counterfeit packages or allow more effective and efficient tracking of the respective package. In the past, tracking of individual packages was generally done using a unique bar code identifier symbol printed on a label attached to a respective package. Tracking using bar coded labels can require specific container orientation, however, for proper scanning which introduces additional process variables.

FIG. 22F shows that the apparatus 10, 10', the reform machine 100, and the method of the present invention can be used to compression form external features on a plastic package. One particular example of such an external feature is the external thread applied to mate with the corresponding thread on the inside diameter of a screw cap. Another example of an external feature is the safety mechanism (such as ramps, tabs, latches, and the like) commonly used to prevent or at least inhibit undesired removal of the cap. The present invention improves the dimensional tolerances that can be achieved for the external thread.

FIG. 22G shows that the apparatus 10, 10', the reform machine 100, and the method of the present invention can be used to form the inverted spouts for certain blow-molded packages. Such inverted spouts are typically used on laundry detergent containers to minimize drips and leaks. FIG. 22H shows that the apparatus 10, 10', the reform machine 100, and the method of the present invention can be used to reform a package having a straight neck into a package having an angled neck.

Finally, FIG. 22I shows that the apparatus 10, 10', the reform machine 100, and the method of the present invention can be used to reform a particular area of a plastic package. In the specific example illustrated, the plastic of a blow-molded PET container is shown manipulated into a handle. The application illustrated in FIG. 22I is not limited to a blow-molded PET material; rather, the material might be a two-stage, stretch-blown PET or, even more generally, other plastics.

Figure 23:
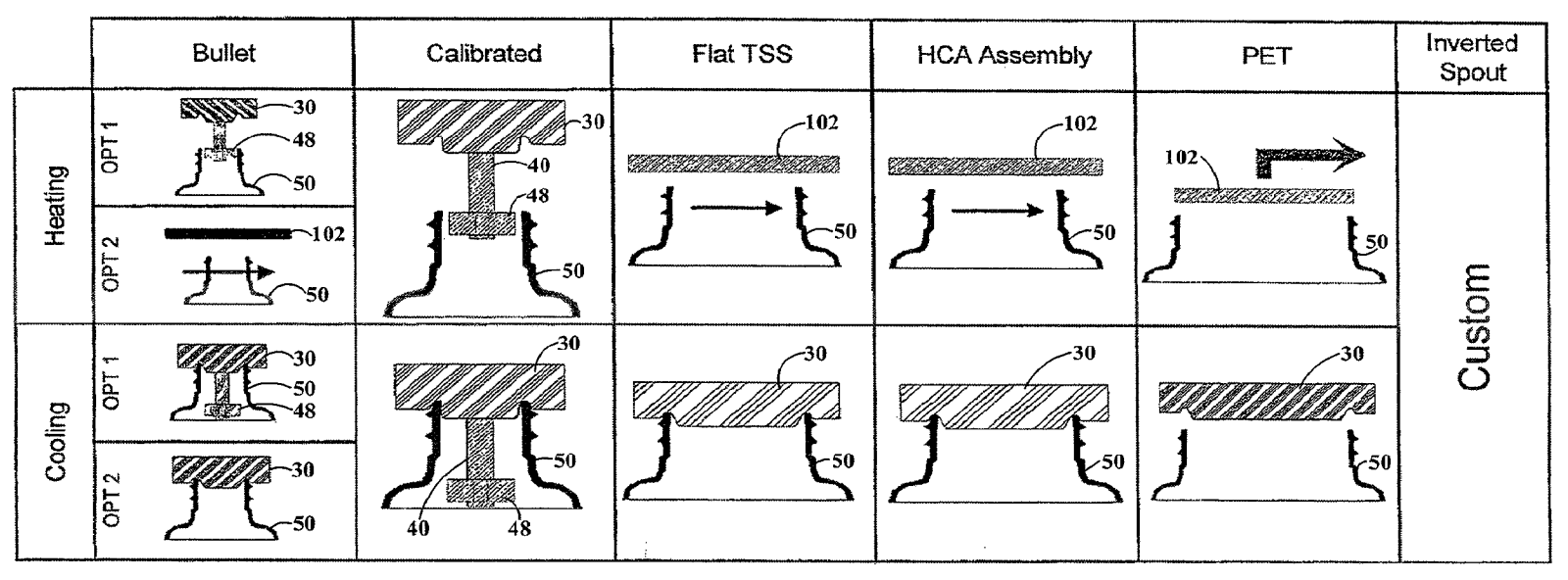

FIG. 23 is a chart illustrating the application of two of the embodiments of the reform machine 100, described above, to six different container neck finishes. The neck finishes of the container 50 include: (1) bullet, (2) calibrated, (3) flat TSS, (4) HCA assembly, (5) PET, and (6) inverted spout. Containers 50 with HCA assemblies typically have dispensers or pour features for dispensing the product. These are typically injection-molded parts that need to be assembled to the container 50. Assembly requires tight tolerances or special features to ensure the parts come together properly and do not leak. The two main steps of the reforming process according to the present invention are listed in separate rows of the chart of FIG. 23, namely (a) heating the neck finish using the disk 48 on the workpiece support 40, using the plate 102, or using (optionally) either of the components; and (b) cooling and forming the neck finish using the forming die 30.

Some of the neck finishes can be reformed using several types of workpieces. For example, the bullet neck finish can be reformed using the disk 48 (one option or "OPT 1" in FIG. 23) and using the plate 102 (a second option or "OPT 2" in FIG. 23). Other neck finishes are more receptive to reforming via a preferred workpiece. For example, the calibrated and PET neck finishes are more receptive to reforming via the disk 48. The disk 48 is also particularly well-suited for custom reforming projects, such as an inverted spout configuration (see the detailed discussion below). On the other hand, the flat TSS and HCA assembly neck finishes can be reformed using the plate 102.

FIG. 24B is a magnified view of a bullet container neck finish before, and FIG. 24A is a magnified view of the same bullet container neck finish after, the container is reformed according to the present invention. FIG. 25B is a magnified view of a flat TSS container neck finish before, and FIG. 25A is a magnified view of the same flat TSS container neck finish after, the container is reformed according to the present invention. FIG. 26B is a magnified view of a calibrated container neck finish before, and FIG. 26A is a magnified view of the same calibrated container neck finish after, the container is reformed according to the present invention. FIG. 27B is a magnified view of a PET container neck finish before, and FIG. 27A is a magnified view of the same PET container neck finish after, the container is reformed according to the present invention. In each of the four cases illustrated, the reforming process of the present invention corrected the discontinuity 112 that existed in the neck finish before application of the reforming process.

The discussion now turns to one particular application of the reform technology according to the present invention. The application is the formation of an inverted spout such as the spout illustrated in FIG. 22G. Three alternatives are highlighted, each of which uses the technology.

In both the first and second alternatives, the process begins by converting the neck finish of the upper portion 52 of the container 50 to a spin trim style finish. FIG. 28 illustrates such a finish, with the container 50 illustrated on the right-hand side of FIG. 28 having a highlight box 124, and the upper portion 52 encompassed within the highlight box 124 magnified on the left-hand side of FIG. 28. The new finish adds hoop strength to the upper portion 52, which will help improve the quality of a guillotine cut applied by the trimming turret 110. Also in both the first and second alternatives, the container 50 is trimmed using the trimming turret 110. The trimming operation will typically cause a discontinuity 112 (see FIG. 19, left-hand side).

Figure 29:
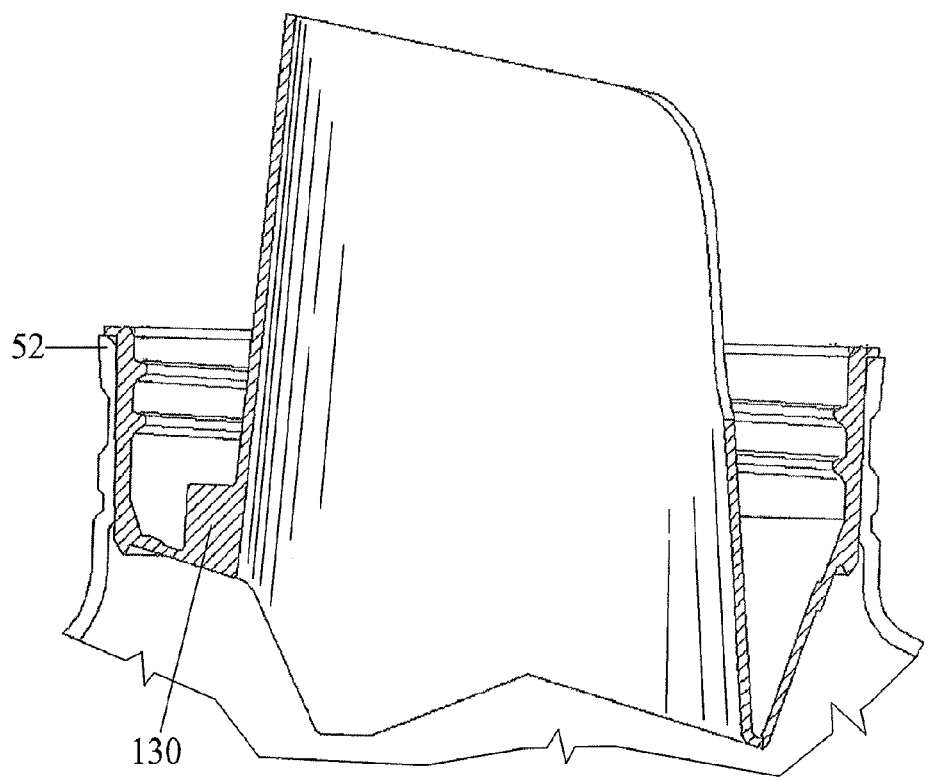
FIG. 29 is a cross-section view of a spout assembled into the upper portion of the container illustrated in FIG. 28 following application of a first alternative of the reform technology according to the present invention.

At this point, the first two alternatives of the application of the reform technology according to the present invention to form an inverted spout diverge. In the first alternative, the upper portion 52 of the container 50 is reformed using a workpiece (such as the disk 48) heated by induction in combination with the cooled forming die 30. The result of this reforming process is the upper portion illustrated in the right-hand side of FIG. 19, i.e., the discontinuity 112 has been corrected. Next, the internally threaded drain back spout 130 is assembled into the upper portion 52 using a separate device—as shown in FIG. 29.

Figure 30A:
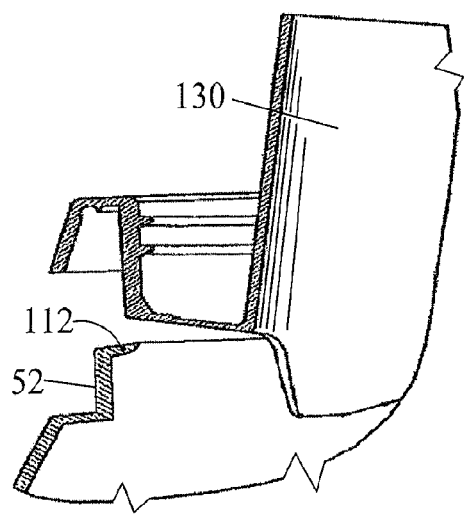
FIG. 30A is a cross-section view of a spout just before assembly into the upper portion of the container illustrated in FIG. 28, after the upper portion has been softened during application of a second alternative of the reform technology according to the present invention.
Figure 30B:
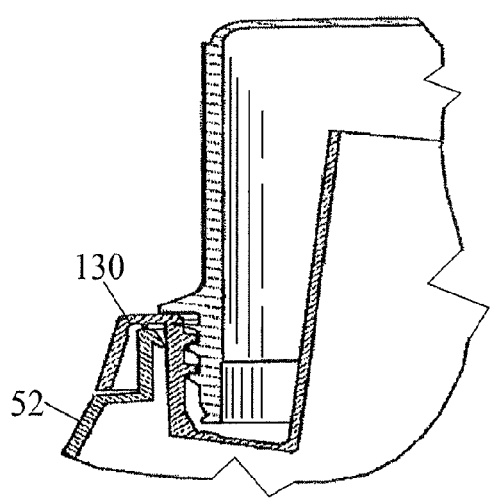
FIG. 30B is a cross-section view illustrating the spout and the upper portion of the container illustrated in FIG. 30A after the components have been assembled pursuant to the second alternative of the reform technology according to the present invention.

In the second alternative, the upper portion 52 of the container 50 is softened using a workpiece (such as the disk 48) heated by induction. Rather than apply the cooled forming die 30, however, the spout 130 is assembled onto the upper portion 52 while the plastic of the upper portion 52 is soft. This assembly step is illustrated in FIG. 30A. Thus, heating of the upper portion 52 and assembly of the spout 130 can be completed using one machine. The result is illustrated in FIG. 30B, which shows correction of the discontinuity 112. In each of the first two alternatives, the excess material that forms the undesirable discontinuity 112 after the trimming operation (which is often a result of poor-quality cuts) is pushed back into the container 50 between the upper portion 52 and the spout 130.

Turn finally to the third alternative of the application of the reform technology according to the present invention to form an inverted spout. FIG. 31A illustrates the first step of this alternative application, which forms a spout 130 integral with the container 50 during the molding process. In the second step, the trimming turret 110 (or another conventional trimming component) slices the spout 130 from the container 50, creating two separate components. The second step is illustrated in FIG. 31B. In the third step of the third alternative, as shown in FIG. 31C, the induction-heated workpiece (e.g., the disk 48) is placed proximate the container 50 to soften the upper portion 52 of the container 50. The last step of the third alternative is illustrated in FIG. 31D: the spout 130 is inverted using a cam-actuated forming die (not shown).

The applications suitable for the apparatus 10, 10', the reform machine 100, and the method of the present invention are not limited to those particular applications specified above. Some of the feasible applications are non-round finishes, custom pour features, features used for assembly, and others. Feasible applications are also not limited to blow-molded plastic containers; rather, they also include all types of plastic containers, such as thermoformed, injection-formed, and compression-formed containers. The apparatus 10, 10', the reform machine 100, and the method of the present invention could be used, for example, to place threads or undercut features on a light-weight thermoformed, injection-formed, or compression-formed cup. This would offer alternatives to companies whose manufacturing techniques typically limit the shape and number of undercuts that a package can have. By coupling thermoforming with reforming, such companies might produce a package at a lower startup cost (equipment) and manufacturing cost than blow molding.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A continuous-motion machine for reforming the upper portion of a plastic package using induction heating, the upper portion to be reformed having a discontinuity, and the machine comprising:
   an induction workhead providing an alternating current power supply;
   a stationary frame having a moving carrier;
   a plurality of reform stations disposed on the moving carrier, each reform station having a workpiece capable of being heated by induction and attaining a temperature of at least about 1200° F. and a forming die comprising a chilled contact surface, the reform stations traveling around a continuous, endless, closed-loop path including the following sections:
   (a) an induction section comprising an induction track connected to the induction workhead, the induction track receiving alternating current from the induction workhead and creating a magnetic field that heats the workpiece by induction when the workpiece travels along the induction track,
   (b) a heating section in which the heated workpiece is located proximate the upper portion of the plastic package to be reformed and heats that upper portion without contacting the upper portion, thereby softening the upper portion,
   (c) a reforming section in which the chilled contact surface of the forming die engages the softened upper portion of the plastic package, thereby cooling the softened upper portion simultaneously as the contact surface reforms the softened upper portion to correct the discontinuity, and
   (d) an output section removing the reformed plastic package from the machine.

2. The machine of claim 1, wherein the path is oval.

3. The machine of claim 1, wherein each reform station further has a neck clamp for holding and releasing the plastic package and a workpiece support on which the workpiece is disposed.

4. The machine of claim 1, wherein the induction track has a pair of copper tubing walls.

5. The machine of claim 1, further comprising a cooling system delivering coolant to cool the induction track and delivering coolant to chill the contact surface of the forming die.

6. The machine of claim 1, wherein the upper portion of the plastic package to be reformed comprises the neck finish of the plastic package.

7. The machine of claim 1, wherein the workpiece is metal.

8. The machine of claim 1, further comprising a programmable logic controller that executes resident software controlling the functional operation of the machine.

9. The machine of claim 1, further comprising a trimming turret for cutting the plastic package.

* * * * *